(12) United States Patent
Huang

(10) Patent No.: US 8,371,193 B2
(45) Date of Patent: Feb. 12, 2013

(54) ADJUSTABLE TORQUE LIMITING DEVICE FOR A CLICK-TYPE TORQUE WRENCH

(76) Inventor: Chin-Tan Huang, Taichung County (TW)

(*) Notice: Subject to any disclaimer, the term of this patent is extended or adjusted under 35 U.S.C. 154(b) by 360 days.

(21) Appl. No.: 12/873,822

(22) Filed: Sep. 1, 2010

(65) Prior Publication Data
US 2011/0061500 A1 Mar. 17, 2011

(51) Int. Cl.
*B25B 23/157* (2006.01)
*B25B 23/159* (2006.01)
*B25B 23/142* (2006.01)
*B25B 23/14* (2006.01)

(52) U.S. Cl. ............... 81/474; 81/473; 81/475; 81/476; 81/477; 81/478; 81/467

(58) Field of Classification Search ............ 81/473–478, 81/467
See application file for complete search history.

(56) References Cited

U.S. PATENT DOCUMENTS 4,712,456 A * 12/1987 Yuan ............................... 81/473
5,576,501 A * 11/1996 Huang ........................ 73/862.23

* cited by examiner

*Primary Examiner* — Monica Carter
*Assistant Examiner* — Danny Hong
(74) *Attorney, Agent, or Firm* — Greenberg Traurig, LLP

(57) ABSTRACT

An adjustable torque limiting device includes a shank unit composed of first and second shanks coaxially and rotatably connected to each other, a carrier unit mounted between the shanks and having axially facing bearing regions and radially facing detent regions which cooperatively define cavities for receiving detent bodies, respectively, so as to transmit a straining force emanating from the detent regions to the detent bodies, a force transmitting member movably mounted on the shank unit and frictionally engaged with the detent bodies, an adjusting assembly turnable to axially move the force-counteracting member, and a compressible biasing member disposed between the force-counteracting member and the adjusting assembly to exert a preloaded force against the straining force.

20 Claims, 23 Drawing Sheets

US 8,371,193 B2

ADJUSTABLE TORQUE LIMITING DEVICE FOR A CLICK-TYPE TORQUE WRENCH

CROSS-REFERENCE TO RELATED APPLICATION

This application claims priority of Taiwanese Patent Application No. 098131059, filed on Sep. 15, 2009, the disclosure of which is herein incorporated by reference.

BACKGROUND OF THE INVENTION

1. Field of the Invention

This invention relates to a torque wrench, more particularly to an adjustable torque limiting device for a click-type torque wrench.

2. Description of the Related Art

Referring to FIG. 1, a conventional adjustable torque wrench 10 is shown to include a shank 11, a ratchet arm 12 mounted on a front end of the shank 11, a torque assembly mounted within the shank 11 and including a roller seat 13, a spring 14, a screw pile 15, and an adjusting handle 16 mounted on a rear end of the shank 11. The ratchet arm 12 has an insert shaft 121 turnably disposed in the shank 11, a driven roller 122 disposed at an inner end of the insert shaft 121, and a ratchet head 123 disposed at an outer end of the insert shaft 121. A driving roller 131 is disposed at a front end of the roller seat 13 to be engaged with the driven roller 122. Rotation of the handle 16 results in movement of the screw pile 15 along the shank 11 so as to vary the preloaded force of the spring 14 to thereby adjust the applied torque of the torque wrench 10.

In use, a predetermined torque value is set by rotating the handle 16, and the ratchet head 123 is connected to a workpiece such as a screw fastener (not shown). The handle 16 is turned about a torque transfer axis of the ratchet head 123 to tighten the workpiece until a turning resistance between the driving and driven rollers 131,122 is overcome so that the insert shaft 121 is permitted to rotate slightly relative to the roller seat 13. At this moment, the workpiece is tightened in a desired state. However, the spring 14 is liable to bend, since there is no means for firmly supporting the spring 14. Moreover, the engagement between the driving and driven rollers 131,122 is not sufficient, so that the adjustment of the torque is not precise and turning of the workpiece is not smooth.

SUMMARY OF THE INVENTION

An object of the present invention is to provide an adjustable torque limiting device for a click-type torque wrench which can enhance the structural strength of the torque wrench and increase the precision of torque adjustment, and which can be used to smoothly tighten a workpiece.

According to this invention, the adjustable torque limiting device includes a shank unit composed of first and second shanks coaxially connected to and rotatable relative to each other, a carrier unit mounted between the first and second shanks and having axially facing bearing regions and radially facing detent regions to cooperatively define cavities, detent bodies respectively received in the cavities and each having a force-receiving area to be engaged with the respective detent region so as to transmit a straining force emanating from the detent region to the detent body, a force transmitting member movably mounted on the shank unit and having counteracting surface segments in frictional engagement with the detent bodies, respectively, such that the force-counteracting member is pushed to move away from the bearing regions once the straining force exceeds a preloaded force acting on the force-counteracting member, and an adjustable preload unit including an adjusting assembly which is turnable to axially move the force-counteracting member, and a compressible biasing member disposed between the force-counteracting member and the adjusting assembly to exert the preloaded force.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
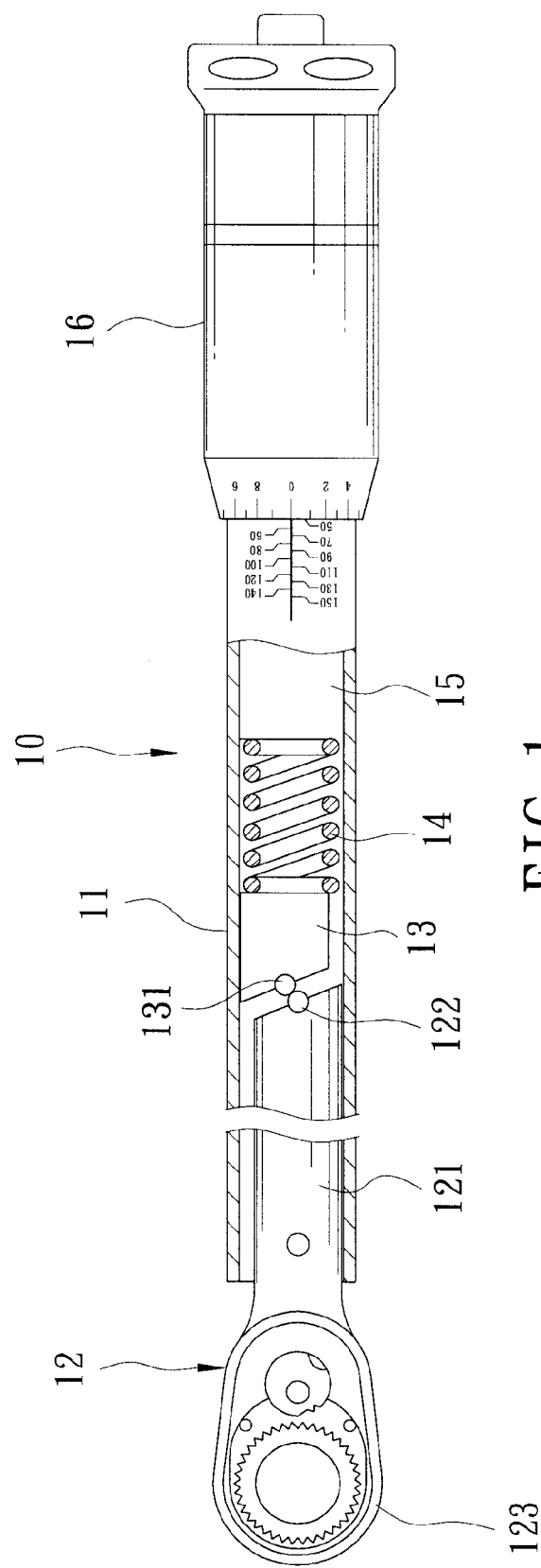
FIG. 1 is a schematic view of a conventional adjustable torque wrench.

Referring to FIGS. 2 to 5, the first preferred embodiment of an adjustable torque limiting device according to the present invention is used for a click-type torque wrench which has a drive head 100 for tightening a workpiece 101, such as a screw fastener. The adjustable torque limiting device according to this embodiment is shown to comprise a shank unit 20, a carrier unit, a plurality of detent bodies 32, a force-counteracting member 33, a guiding unit 41, an adjustable preload unit, and a calibrated scale unit 60.

The shank unit 20 includes first and second shanks 21,27 extending along a longitudinal axis (I). The first shank 21 has a first lever-side end 22 and a first coupling end 26 opposite to each other. A non-circular hole portion 25 is formed in the first lever-side end 22 to be connected with a drive head 100. The second shank 27 has a second lever-side end 273 and a second coupling end 271 opposite to each other, and a threaded segment 272 interposed therebetween. The second coupling end 271 is coaxially coupled with the first coupling end 26 by means of a screw bolt 28 such that the first and second shanks 21,27 are axially unmovable relative to each other.

The carrier unit is mounted proximate to the first and second coupling ends 26,271. In this embodiment, the carrier unit includes an annular mount 23 and a tubular bearing seat 31. The annular mount 23 is formed integrally with and extends radially from the first coupling end 26 of the first shank 21, and has an inner tubular surface 24 that surrounds the longitudinal axis (I) and that defines a compartment 231 therein. The inner tubular surface 24 has a plurality of detent regions 241 and a plurality of ridge regions 243 alternately arranged about the longitudinal axis (I) and facing in radial directions relative to the longitudinal axis (I). The second coupling end 271 of the second shank 27 extends into the compartment 231 to be surrounded by the inner tubular surface 24. At least two of the detent regions 241 are diametrically opposite to each other. The tubular bearing seat 31 is disposed in the compartment 231, and has an axially extending tubular wall 313 which has a non-circular hole portion 314 that is non-rotatably sleeved on the second coupling end 271 so that the axially extending tubular wall 313 is radially spaced apart from the inner tubular surface 24, and a circumferential surface 311 which faces axially and away from the first lever-side end 22 and which has a plurality of bearing regions 315. Each bearing region 315 cooperates with the respective detent region 241 to define a cavity (A) and to constitute a detent assembly.

Each detent body 32 is in the form of a ball with a spherical peripheral surface, and is received in the respective cavity (A) such that a force-receiving area 322 of the peripheral surface is engaged with the respective detent region 241 to transmit a straining force emanating from the respective detent region 241 to a force-delivering area 321 of the peripheral surface.

The force-counteracting member 33 is movably sleeved on the axially extending tubular wall 313, and has a counteracting surface that includes a plurality of counteracting surface segments 332 which extend radially and which are axially spaced apart from the bearing regions 315, respectively. Each counteracting surface segment 332 is in frictional engagement with the force-delivering area 321 of the respective detent body 32. Each counteracting surface segment 332 has a cam surface region 333 in the form of a slope to radially urge the force-receiving area 322 of the respective detent body 32 to the respective detent region 241.

The guiding unit 41 is in the form of a tubular barrel which is non-rotatably mounted on the second coupling end 271 of the second shank 27 and which has a plurality of passages 411 that are angularly displaced from one another about the longitudinal axis (I) and that are in spatial communication with the respective cavities (A) to serve as a plurality of guideways 411.

The adjustable preload unit includes an adjusting assembly 50 and a plurality of compressible biasing members 40. The adjusting assembly 50 includes a press plate 51 sleeved on and axially movable relative to the threaded segment 272, an internally threaded wheel member 52 threadedly engaged with the threaded segment 272, and a drive ring 53 surrounding and in spline engagement with a rim 521 of the wheel member 52. Each compressible biasing member 40 is disposed in and is compressible along the respective passage 411 between the force-counteracting member 33 and the press plate 51 to exert a preloaded force on the respective counteracting surface segment 332. In this embodiment, each compressible biasing member 40 includes first and second compressible springs 42,43 coaxially disposed in the respective passage 411.

The calibrated scale unit 60 includes a calibrated scale 61 formed on an outer tubular surface of the tubular barrel 41, and a pointer 62 formed on the outer tubular surface of the drive ring 53 so as to be moved angularly therewith for setting a predetermined value indicative of a predetermined amount of torque adjustment on the calibrated scale 61.

Figure 2:
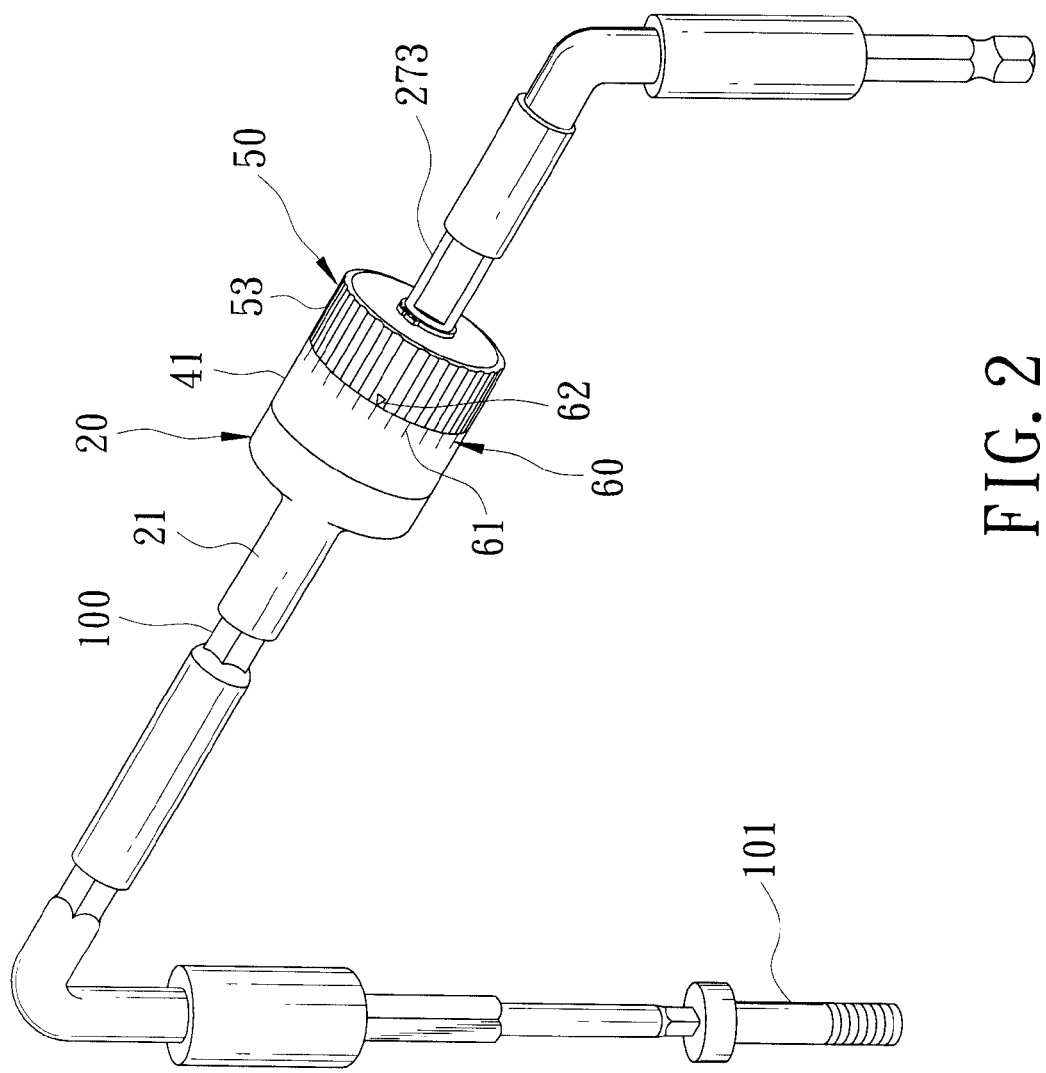
FIG. 2 is a perspective view of the first preferred embodiment of an adjustable torque limiting device for a click-type torque wrench according to this invention.
Figure 3:
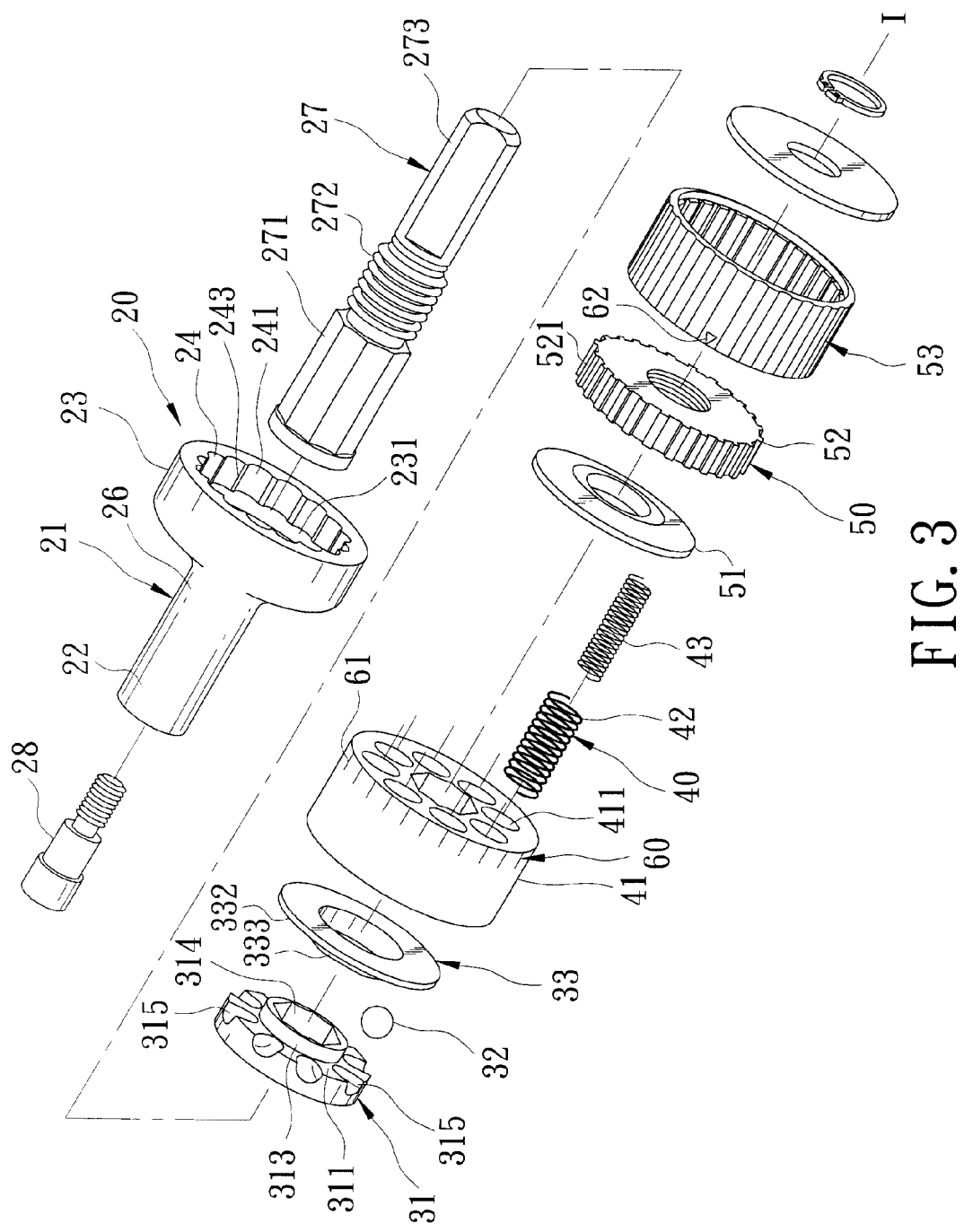
FIG. 3 is an exploded perspective view of the first preferred embodiment.
Figure 6:
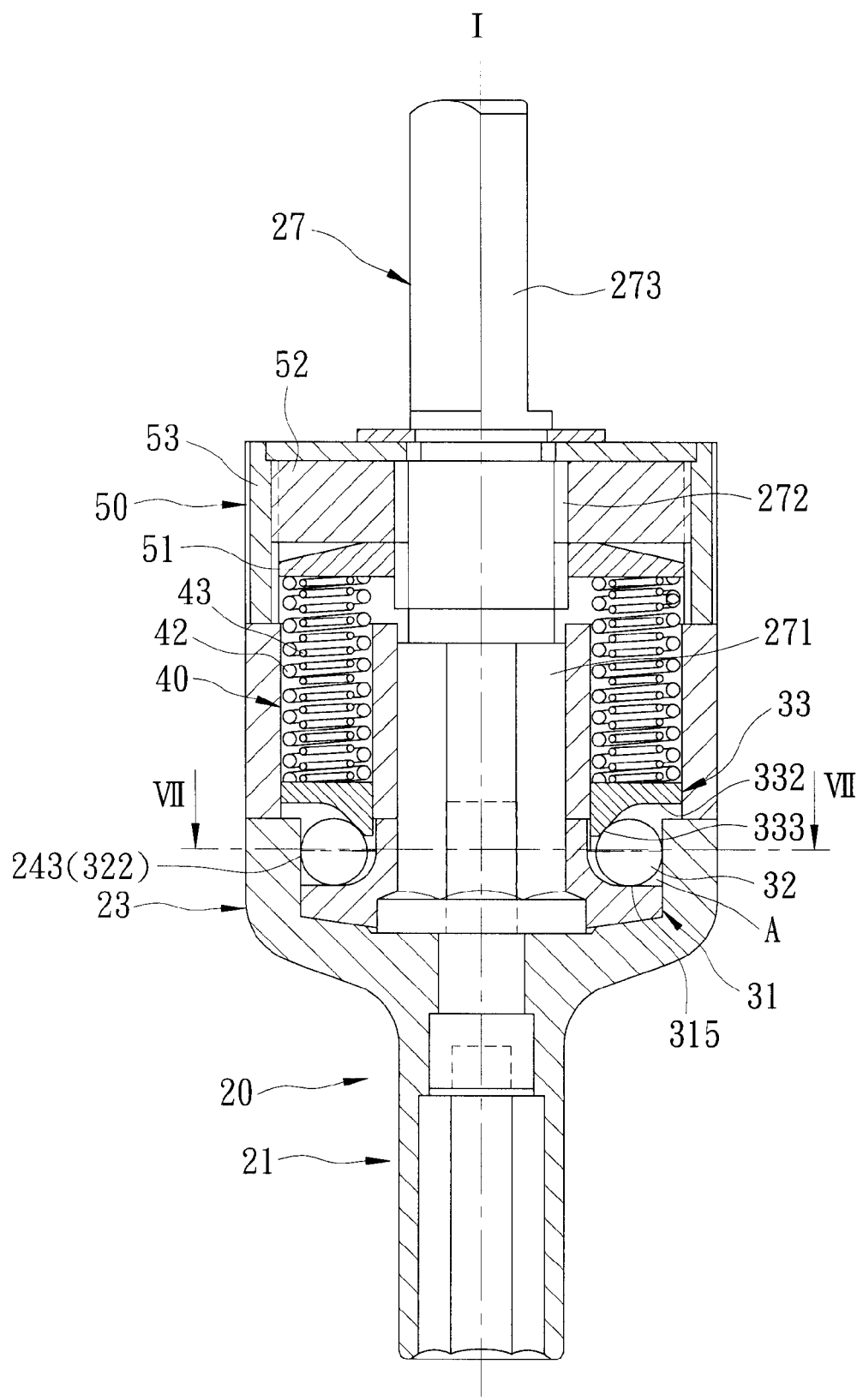
FIG. 6 is a sectional view of the first preferred embodiment in an overloaded state.
Figure 7:
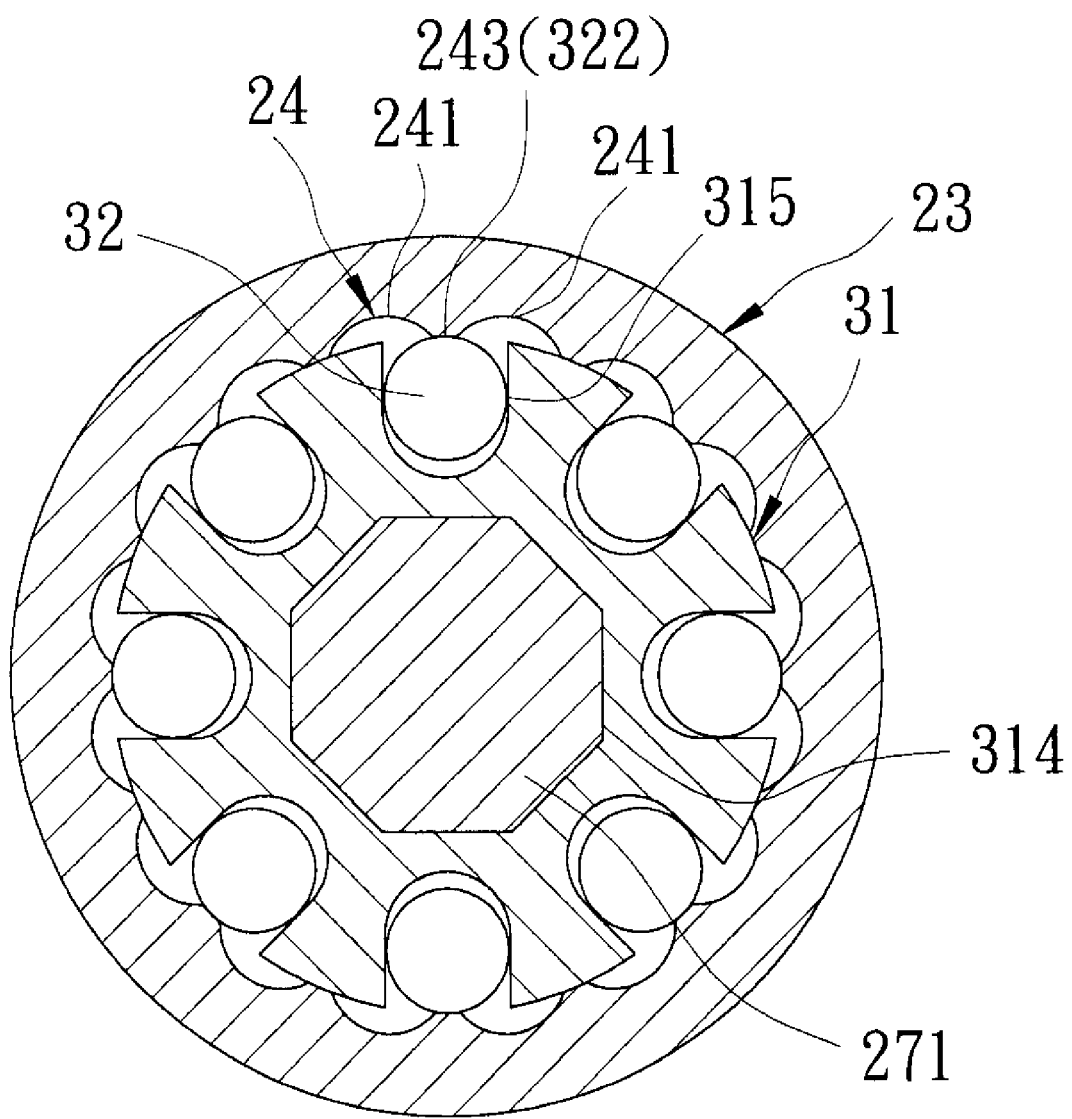
FIG. 7 is a cross-sectional view taken along lines VII-VII of FIG. 6.

In use, once the straining force exceeds the preloaded force of each compressible biasing member 40, the first shank 21 is turned such that the ridge regions 243 are in frictional engagement with the respective detent bodies 32 to thereby move the detent bodies 32 toward the longitudinal axis (I) and that the force-counteracting member 33 is pushed to move away from the bearing regions 315, as shown in FIGS. 2, 6 and 7. At this stage, the movement of the force-counteracting member 33 can be felt by an operator.

Figure 4:
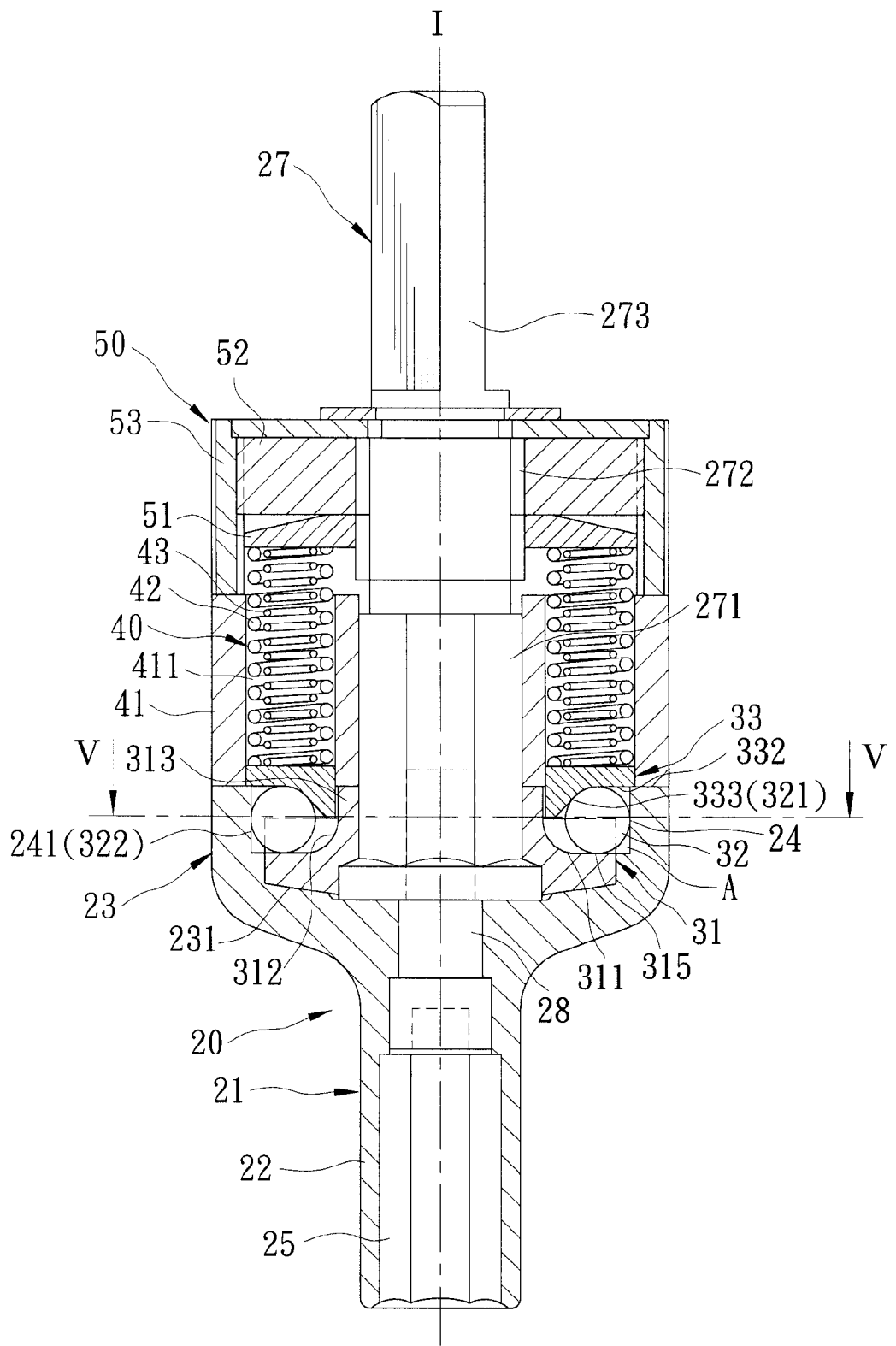
FIG. 4 is a sectional view of the first preferred embodiment in a normal state.
Figure 5:
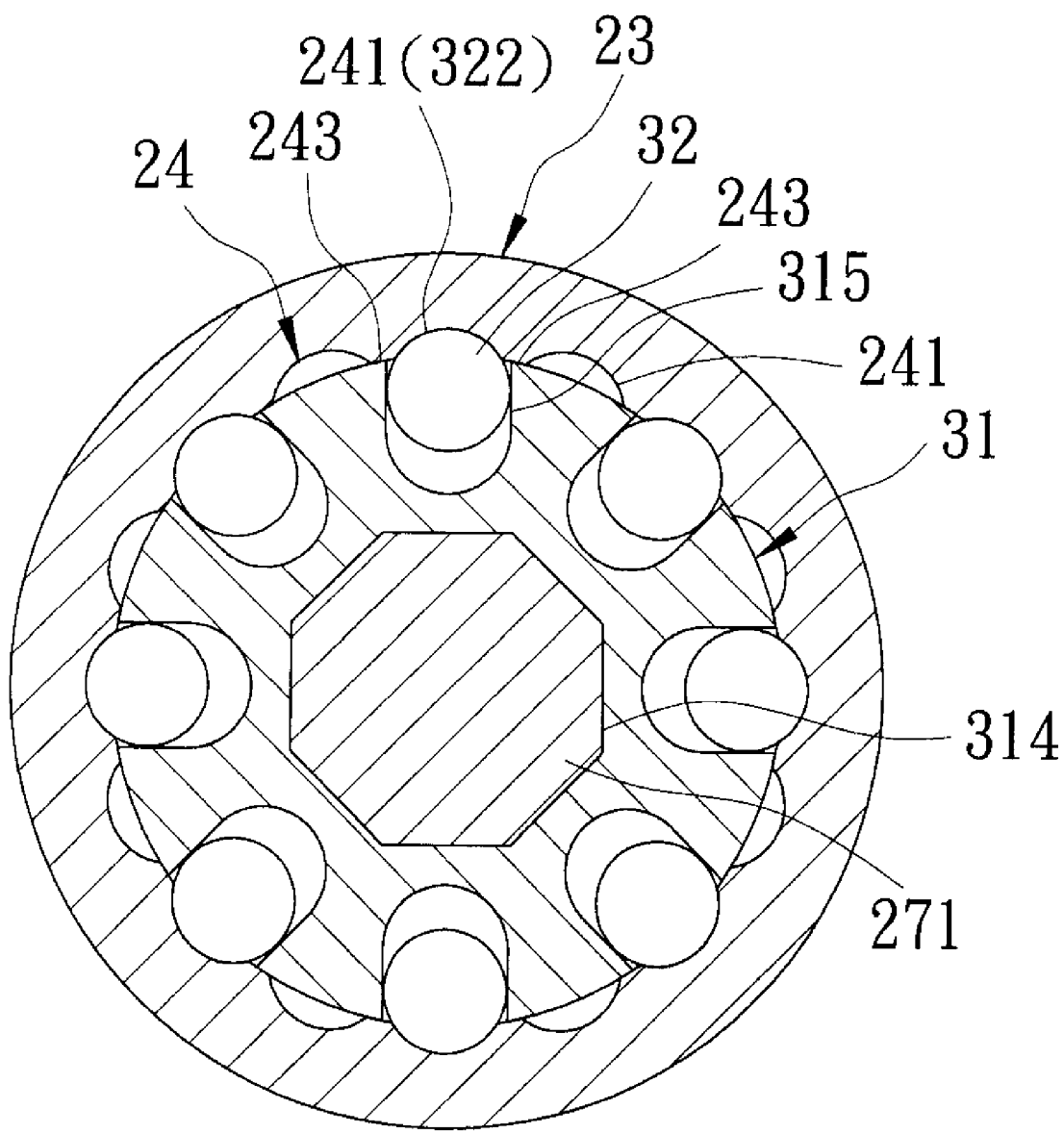
FIG. 5 is a cross-sectional view taken along lines V-V of FIG. 4.
Figure 8:
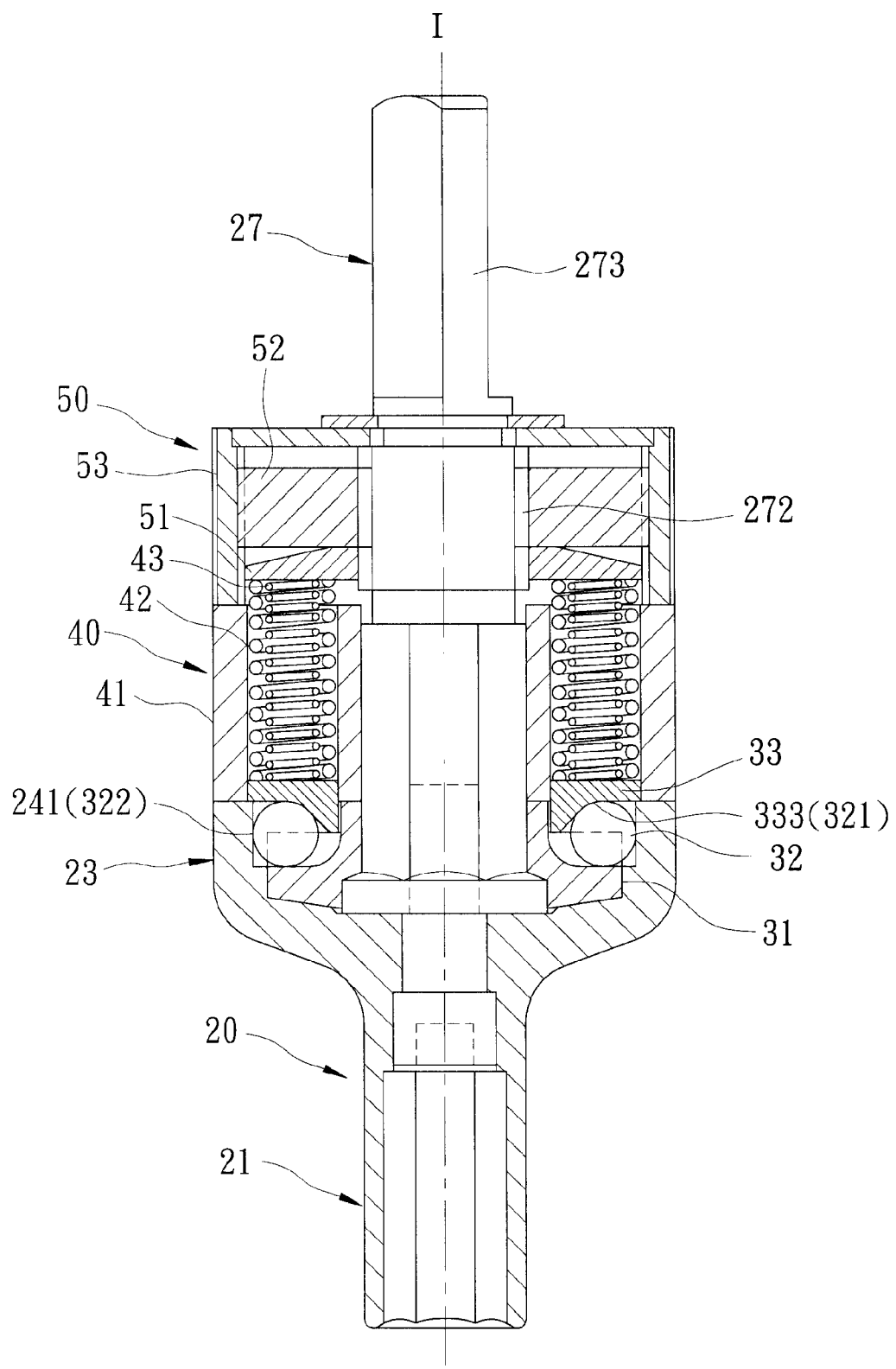
FIG. 8 is a sectional view of the first preferred embodiment in a preload increased state.

Referring to FIGS. 4 and 8, when it is desired to adjust the predetermined torque of the torque wrench of this embodiment, turning of the drive ring 53 about the longitudinal axis (I) can move the internally threaded wheel member 52, as well as the press plate 51, axially relative to the drive ring 53 so as to vary a distance between the press plate 51 and the force-counteracting member 33 to thereby vary the preloaded force of the compressible biasing members 40.

As illustrated, by virtue of the structure of the bearing seat 31, the detent bodies 32 and the force-counteracting member 33, the force-counteracting member 33, which is subjected to the axial preloaded force, can urge the detent bodies 32 to the inner tubular surface 24 such that a torque is generated as a result of the transmission of straining forces emanating from the detent regions 241. In the embodiment shown in FIG. 4, an outer tubular surface of the axially extending tubular wall 313 which radially confronts the inner tubular surface 24 has a plurality of confronting regions, each extending radially to join the respective bearing region 315 and having a cam surface 312 configured to radially urge the respective detent body 32 to the respective detent region 241.

Figure 9:
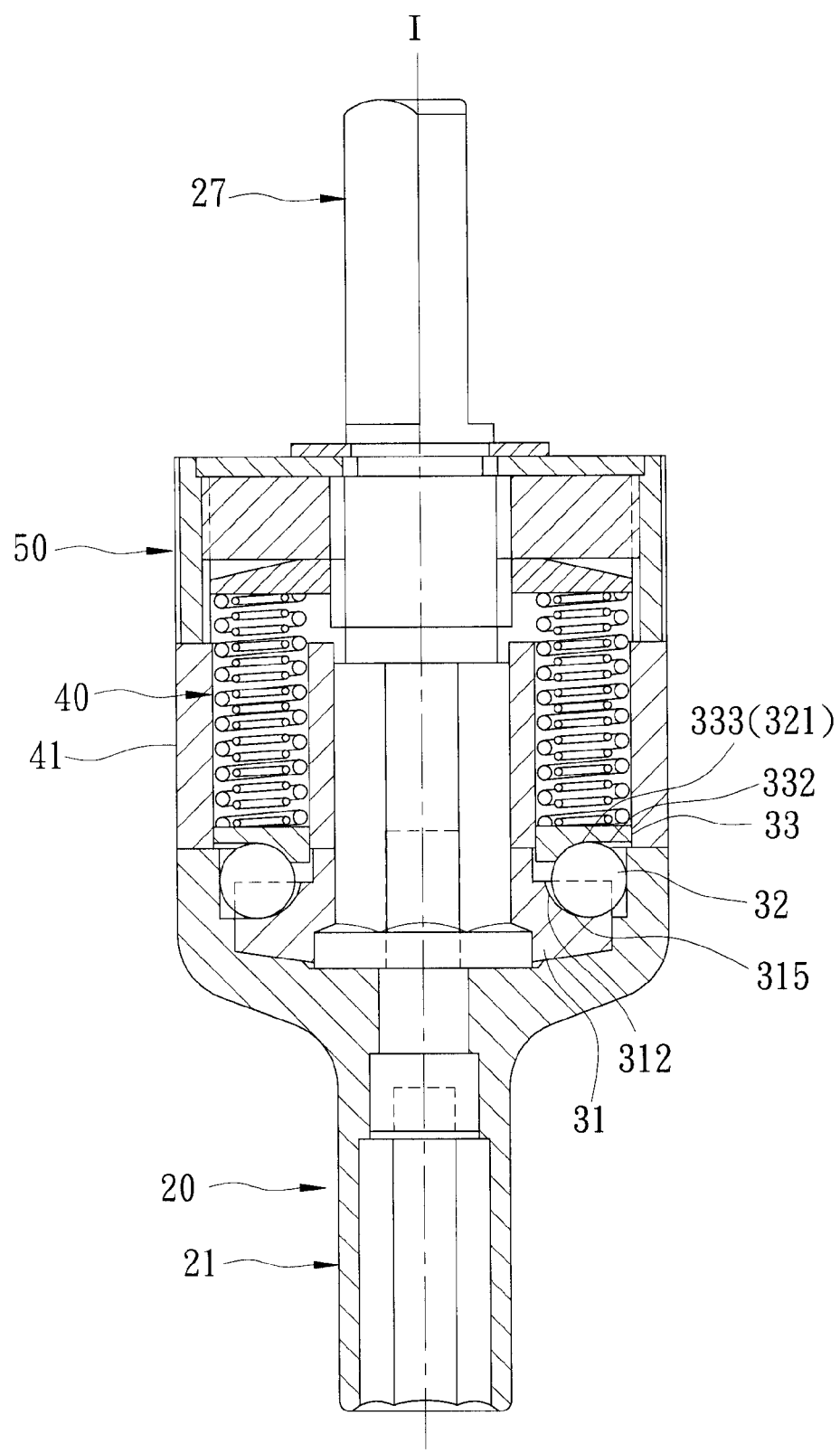
FIGS. 9 to 14 are respectively sectional views of the first preferred embodiment in different modified forms.
Figure 10:
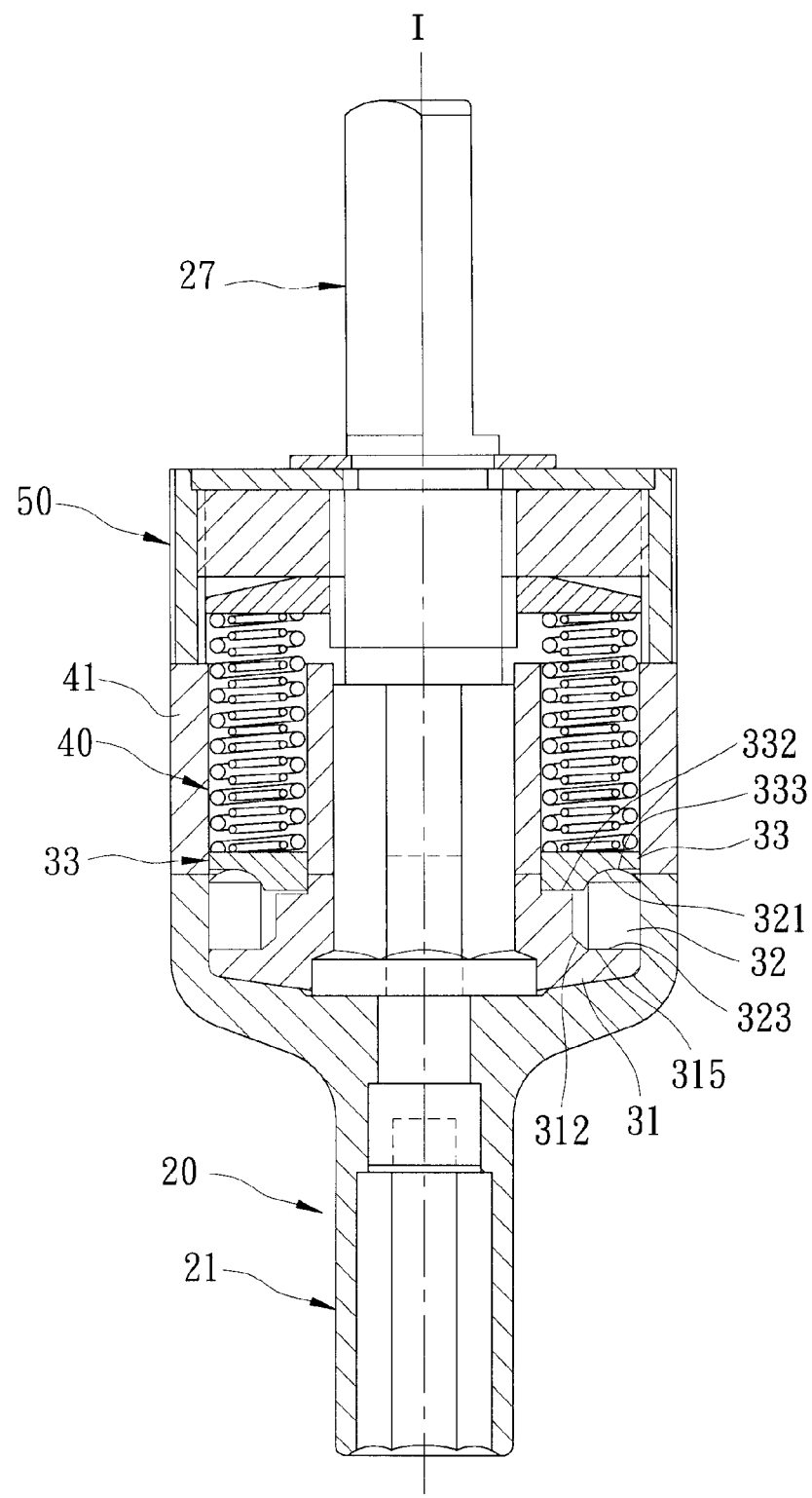
Figure 11:
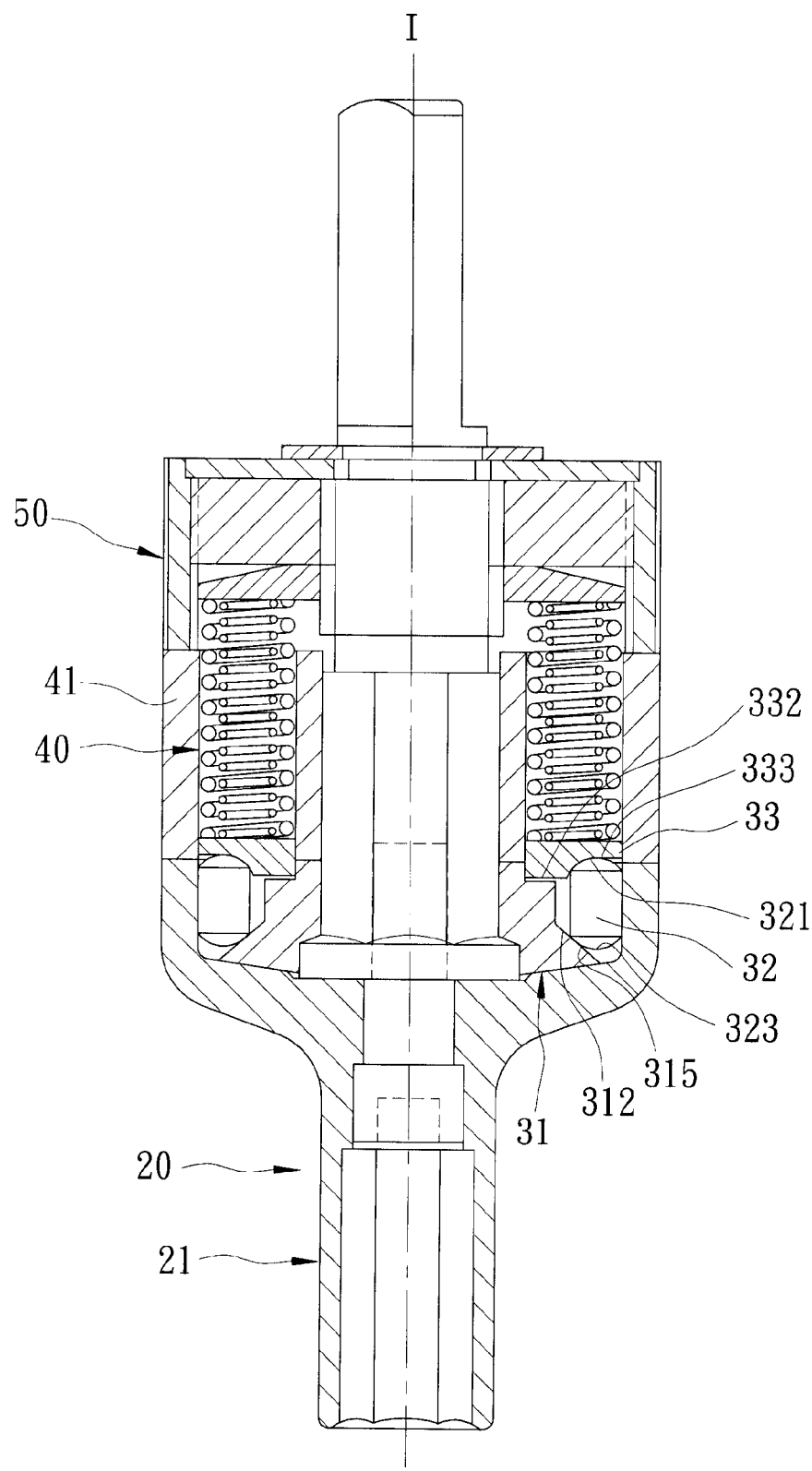
Figure 12:
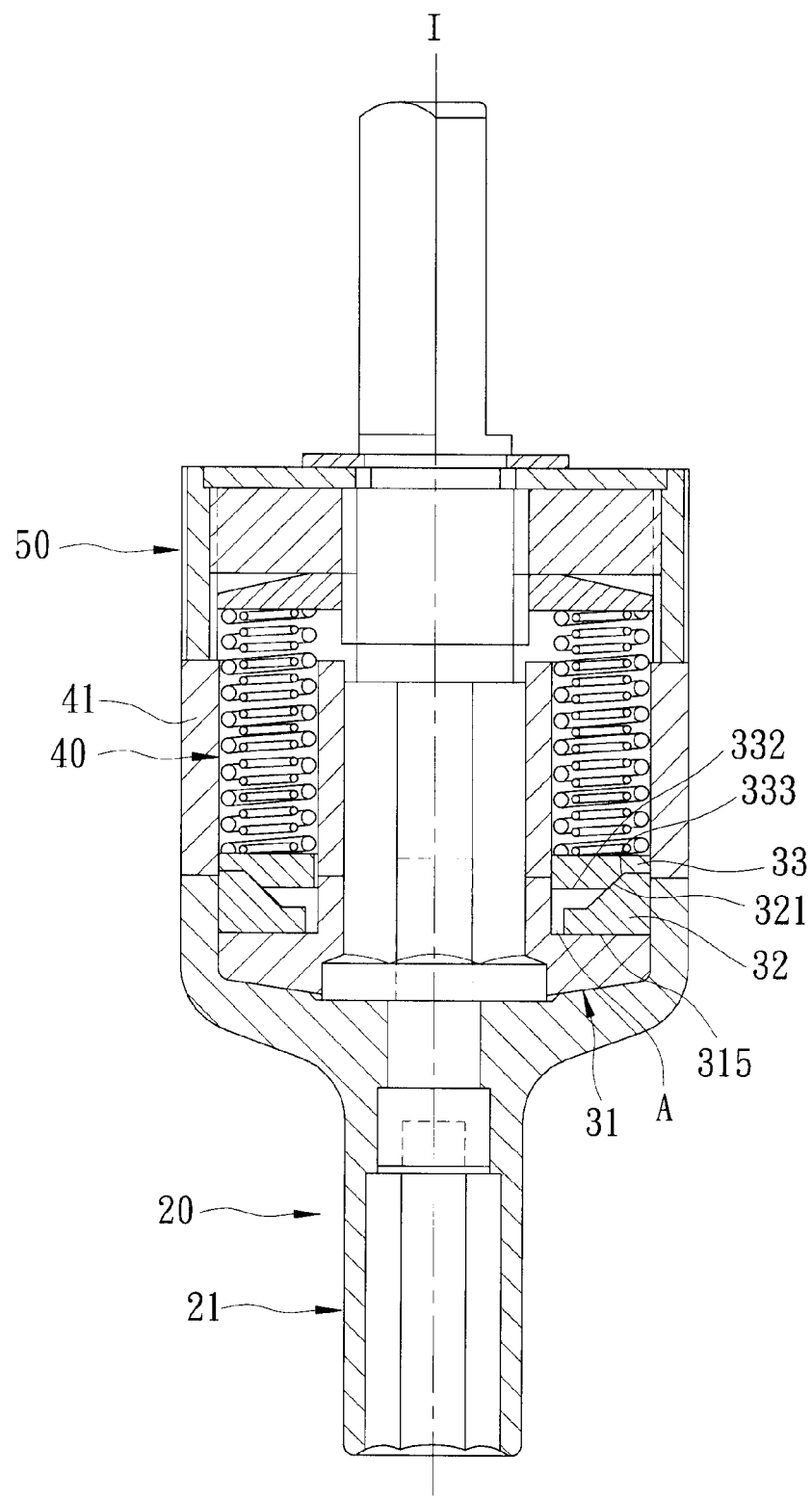
Figure 13:
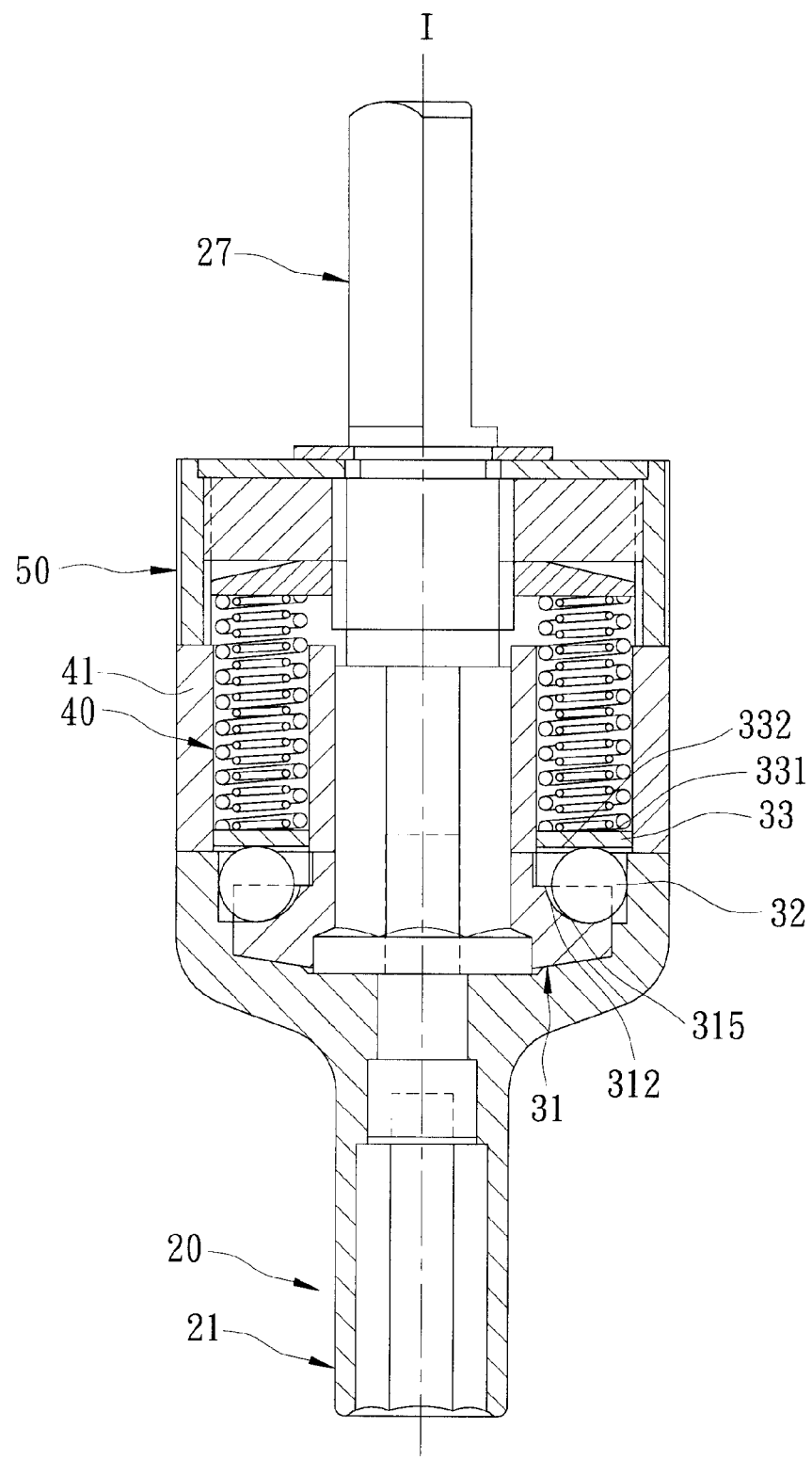
Figure 14:
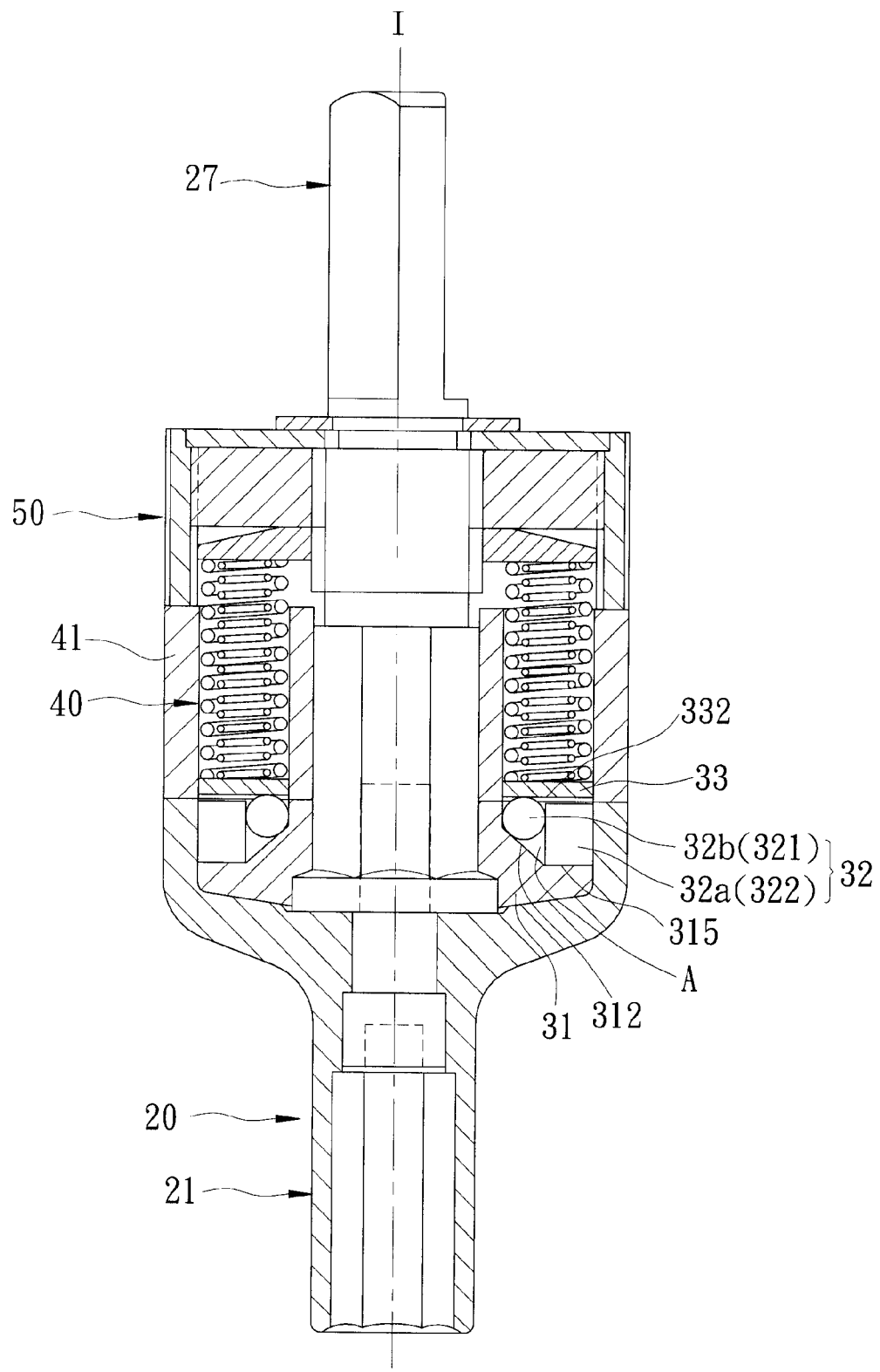

Alternatively, in a first modified form of the first embodiment as shown in FIG. 9, the cam surface 312 is formed on the bearing region 315 and has a semi-spherical shape. In a second modified form of the first embodiment as shown in FIG. 10, each bearing region 315 is flat, and each detent body 32 is in the form of an axially extending roller having two ends 321,323 which are opposite to each other along the longitudinal axis (I) and which are respectively brought into frictional engagement with the respective counteracting surface segment 332 and the bearing region 315. In a third modified form of the first embodiment as shown in FIG. 11, each detent body 32 is in the form of an axially extending roller having two rounded ends 321,323, and the cam surface 312 is a slope to enable the respective detent body 32 to incline radially and outwardly. In a fourth modified form of the first embodiment as shown in FIG. 12, each detent body 32 has a slope which is configured to mate with the respective cam surface region 333 so as to serve as the force-delivering area 321. In a fifth modified form of the first embodiment as shown in FIG. 13, each counteracting surface segment 332 is flat. In a sixth modified form of the first embodiment as shown in FIG. 14, each detent body 32 includes an axially extending cylindrical stem (32a) which serves as the force-receiving area 322, and a ball (32b) which is in frictional engagement with both the cylindrical stem (32a) and the counteracting surface segment 332 so as to serve as the force-delivering area 321.

Figure 15:
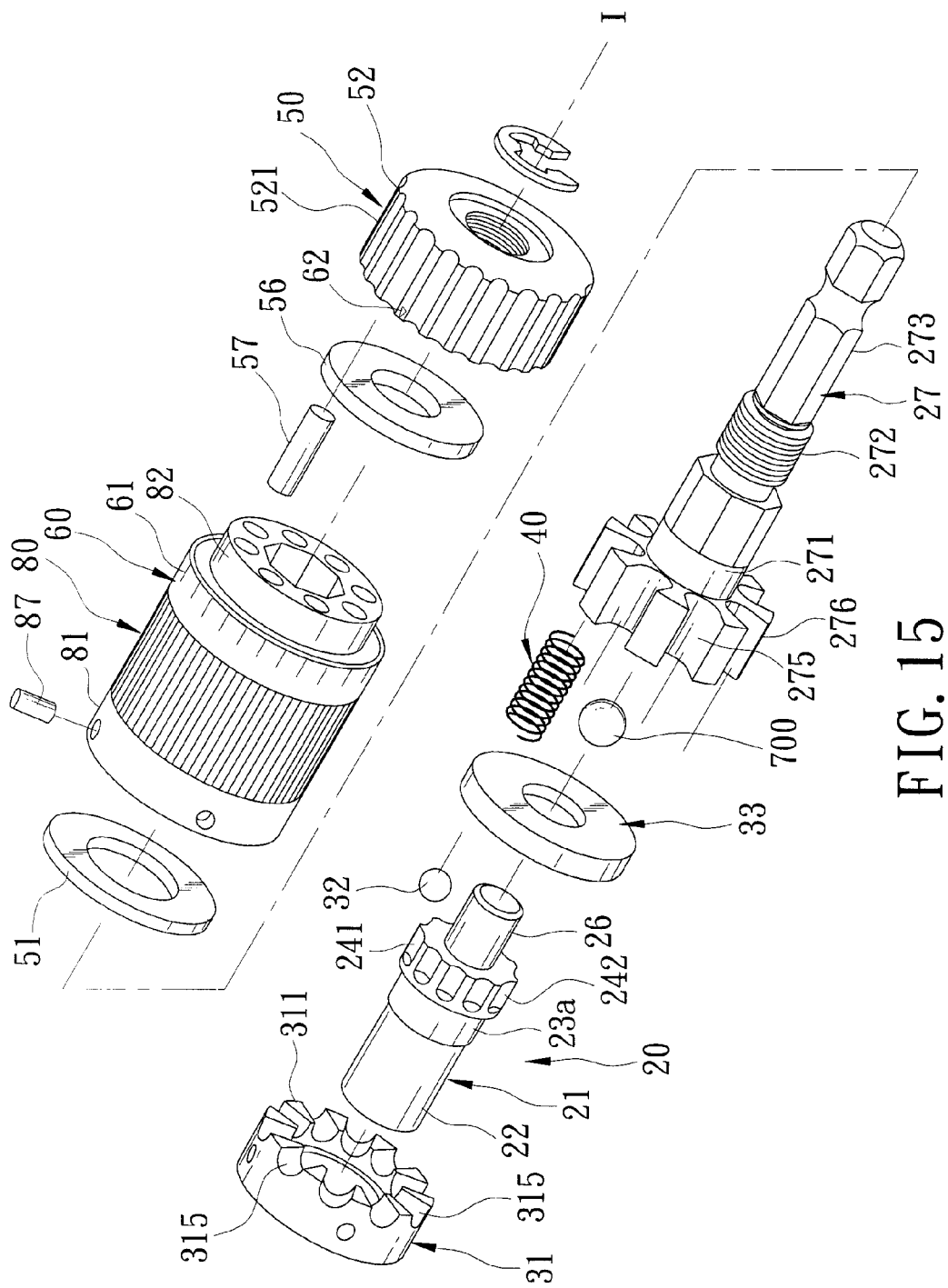
FIG. 15 is an exploded perspective view of the second preferred embodiment of an adjustable torque limiting device according to this invention.
Figure 16:
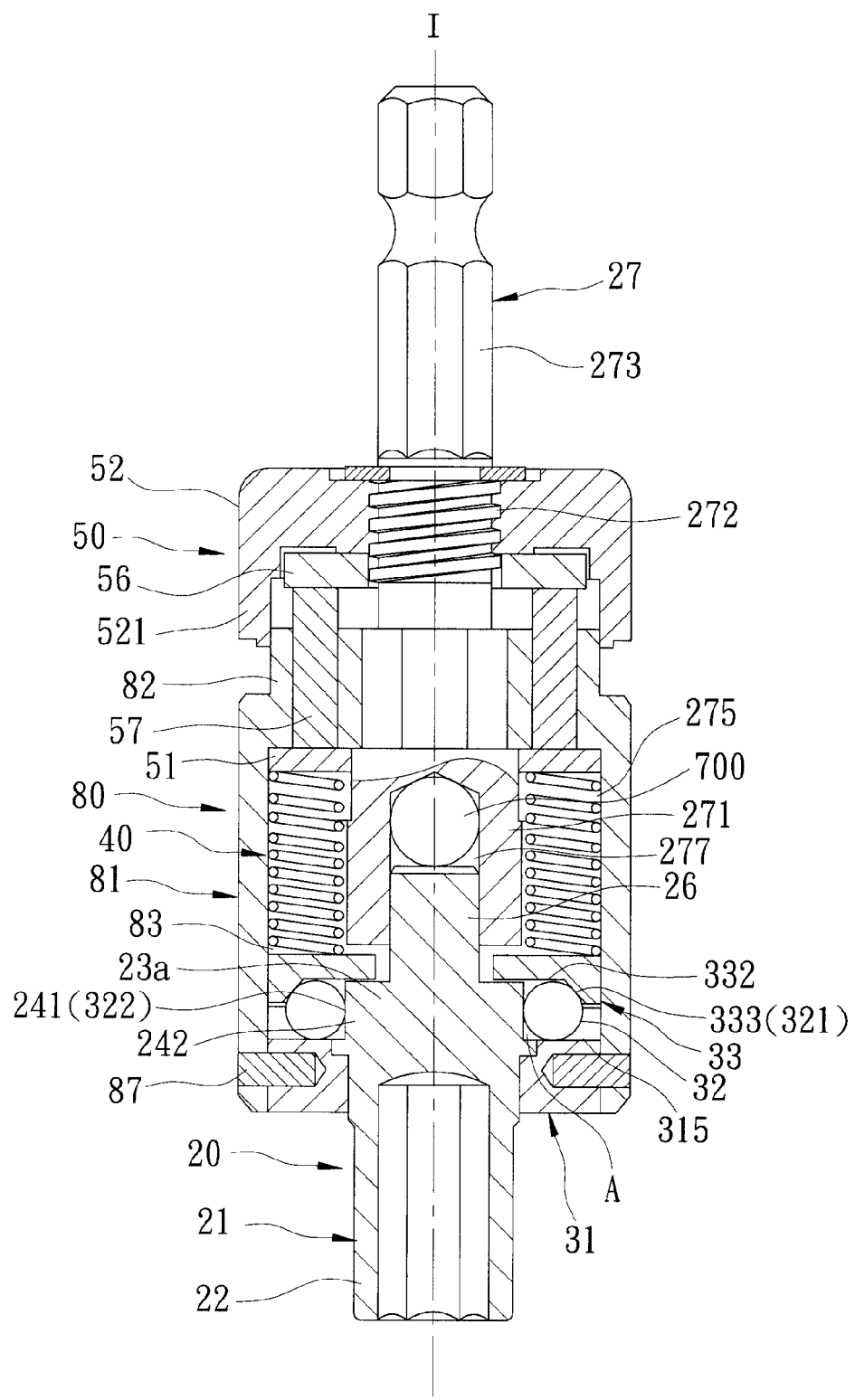
FIG. 16 is a sectional view of the second preferred embodiment.

Referring to FIGS. 15 and 16, the second preferred embodiment of an adjustable torque limiting device according to this invention is shown to be similar to the previous embodiment. In this embodiment, the first shank 21 has an intermediate segment (23a) interposed between the first lever-side and coupling ends 22,26. The carrier unit includes a tubular wall 242 and a tubular bearing seat 31. The tubular wall 242 is integrally formed with the intermediate segment (23a), and has an outer surrounding surface that has the detent regions 241. The bearing seat 31 is non-rotatably mounted to the second shank 27, and has a circumferential surface 311 that faces axially and away from the first lever-side end 22 and that has the bearing regions 315.

Further, the guiding unit 80 includes a barrel wall 81 which surrounds the tubular wall 242 and the bearing seat 31 to cooperatively define an annular compartment 83 for guarding the detent bodies 32 against movement out of the cavities (A), a plurality of partitioning walls 276 which are displaced angularly from one another about the longitudinal axis (I) and which extend radially from the second coupling end 271 toward the barrel wall 81 so as to define a plurality of passages 275 that serve as the guideways, and a small-diameter sleeve 82 which extends axially from the barrel wall 81 and which is non-rotatably mounted on the second shank 27. The bearing seat 31 is secured to the barrel wall 81 by means of pins 87.

The adjusting assembly 50 includes a press plate 51 which is sleeved on and which is axially movable relative to the second coupling end 271, an internally threaded wheel member 52 which is threadedly engaged with the threaded segment 272 such that threaded movement of the internally threaded wheel member 52 relative to the threaded segment 272 results in axial movement of the press plate 51 relative to the force-counteracting member 33, an actuated plate 56 which is actuated by virtue of the threaded movement of the internally threaded wheel member 52 to axially move relative to the force-counteracting member 33, and a stabilizer unit including a plurality of posts 57 which extend through the small-diameter sleeve 82 to engage both the actuated plate 56 and the press plate 51 so as to result in synchronous movement of the press plate 51 and the actuated plate 56.

The internally threaded wheel member 52 has a rim 521 configured to be axially registered with the barrel wall 81. The calibrated scale unit 60 includes a calibrated scale 61 formed on an outer tubular surface of the barrel wall 81, and a pointer 62 formed on the rim 521 to move angularly therewith for setting a predetermined value indicative of a predetermined amount of torque adjustment on the calibrated scale 61.

Further, the second coupling end 271 has a blind hole 277 extending along the longitudinal axis (I) to permit insertion of the first coupling end 26 into the blind hole 277. A ball 700 is disposed in the blind hole 277 to engage the first coupling end 26 so as to facilitate engagement between the first and second shanks 21,27.

Referring to FIGS. 17 to 20, the third preferred embodiment of an adjustable torque limiting device according to this invention is shown to be similar to the previous embodiments. In this embodiment, the first and second coupling ends 271,26 are coupled with each other by means of a snap-ring fastener 28' to be axially unmovable relative to each other. The first lever-side end 22 of the first shank 21 is in the form of a non-circular plug head to be inserted into a screw fastener 100 or a drive head 29 for fastening a screw fastener 100. The bearing seat 31 is integrally formed with the second shank 27. Only one compression spring 40 is disposed to surround the second shank 27 and abuts against an annular flange 334 of the force-counteracting member 33 and the press plate 51.

In addition, the annular mount 23 has a guiding wall 233 extending opposite to the first shank 21 such that the axial movement of the rim 521 of the wheel member 52 is guided by the annular guiding wall 233.

The wheel member 52 has a taper surface 525 which is disposed to be in contact with the press plate 51 so as to decrease the contact area between the wheel member 52 and the press plate 51 to thereby facilitate rotation of the wheel member 52.

The wheel member 52 further has a first outer spline surface 524. The device of this embodiment further comprises a locking unit 70 which includes an inner retaining hoop 71, a rotation preventing ring 72, an outer retaining hoop 73, and a locking sleeve 74.

The inner retaining hoop 71 is looped about the wheel member 52 adjacent to the outer spline surface 524. The rotation preventing ring 72 is non-rotatably sleeved on a non-circular segment 274 of the second shank 27, and has a second outer spline surface 721. The outer retaining hoop 73 is looped about the second shank 27 adjacent to the non-circular segment 274 so as to prevent axial movement of the rotation preventing ring 72 away from the second shank 27. The locking sleeve 74 has inner and outer sleeve surfaces 741,742, first and second annular grooves 743,744 formed in the inner sleeve surface 741, and an inner spline surface segment 745 in spline engagement with the first and second outer spline surfaces 524,721, and a barrier sidewall 746 disposed as a barrier for the rotation preventing ring 72. By engagement of the inner retaining hoop 71 with the first or second annular groove 743,744, removal of the locking sleeve 74 from the wheel member 52 is prevented.

Figure 18:
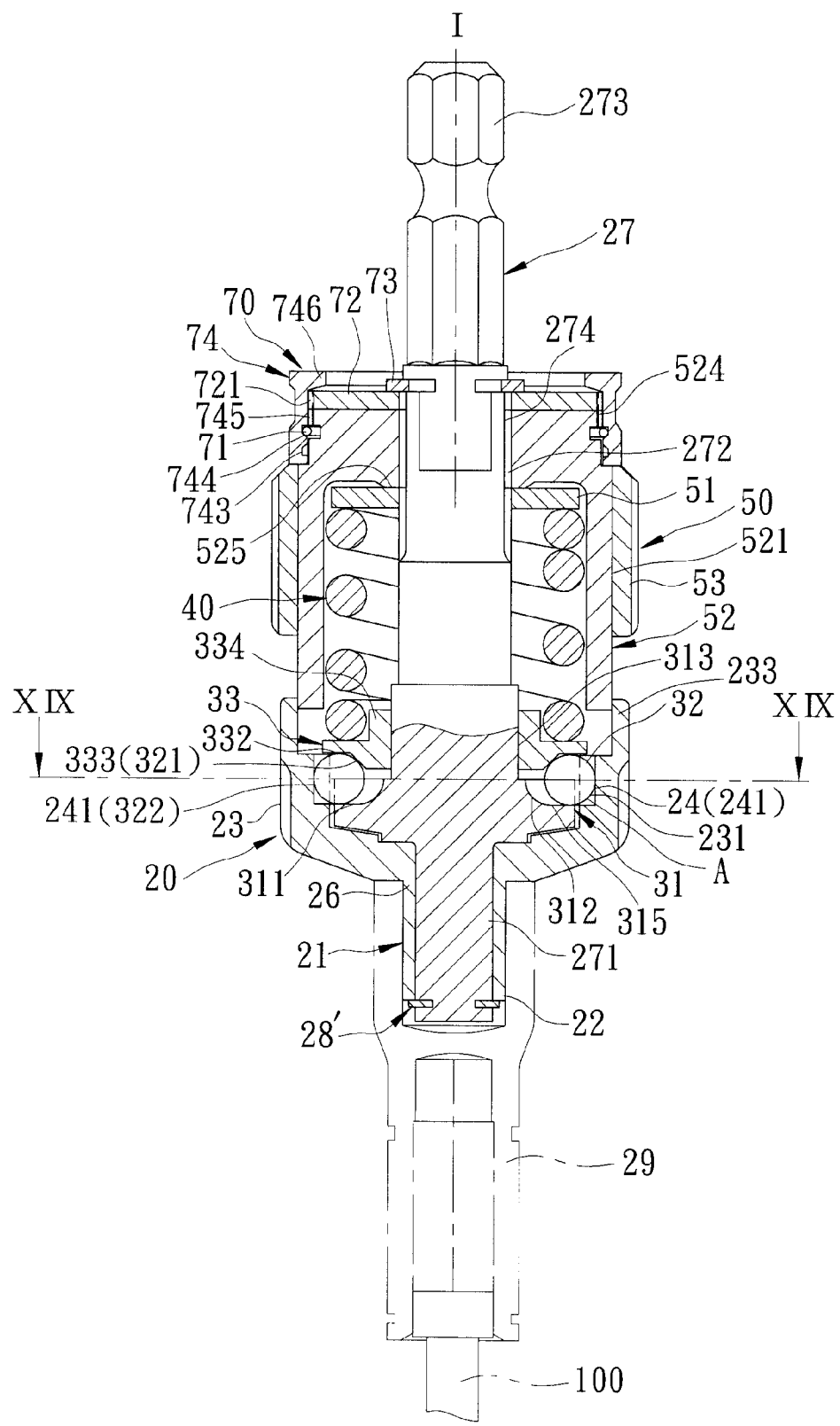
FIG. 18 is a sectional view of the third preferred embodiment in a locked state.
Figure 19:
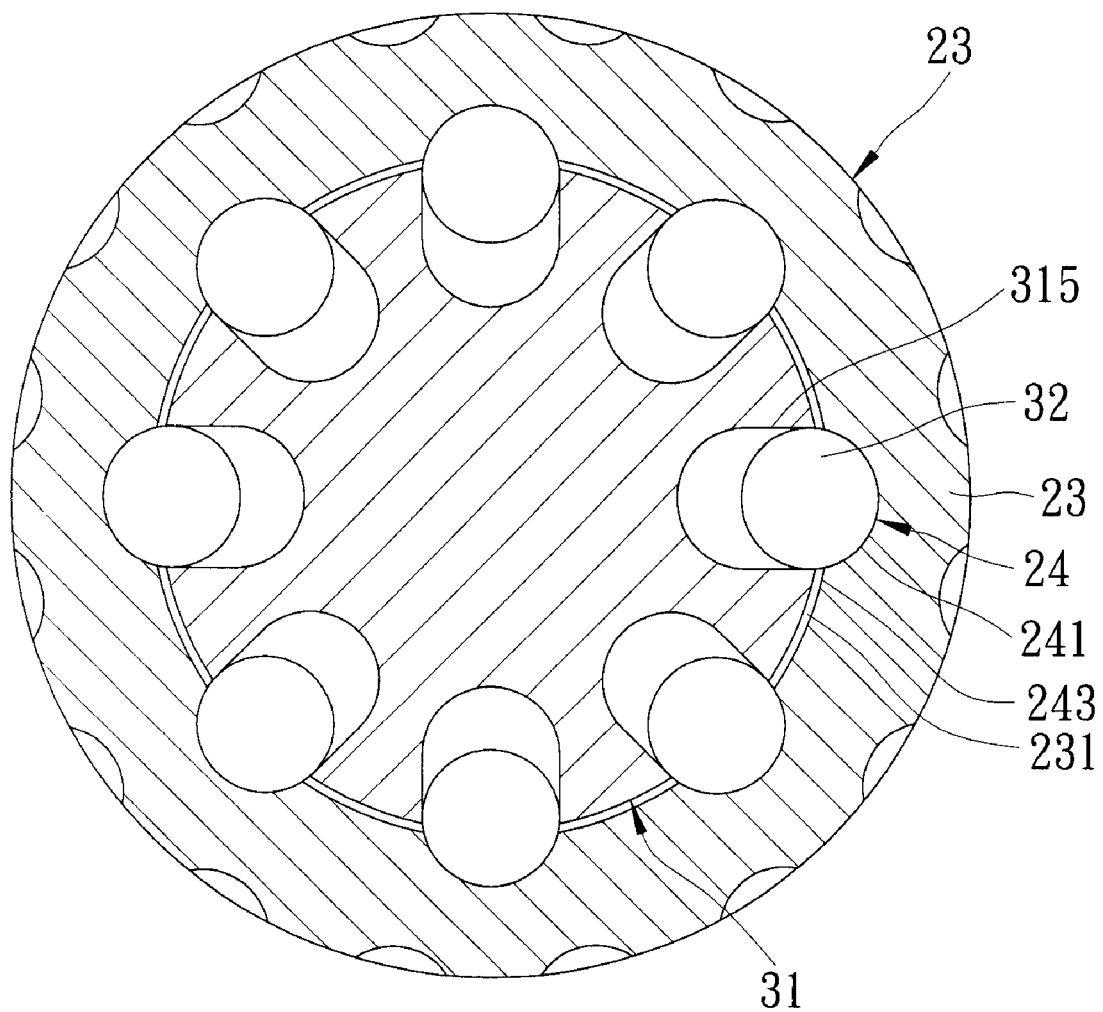
FIG. 19 is a cross-sectional view taken along lines XIX-XIX of FIG. 18.
Figure 20:
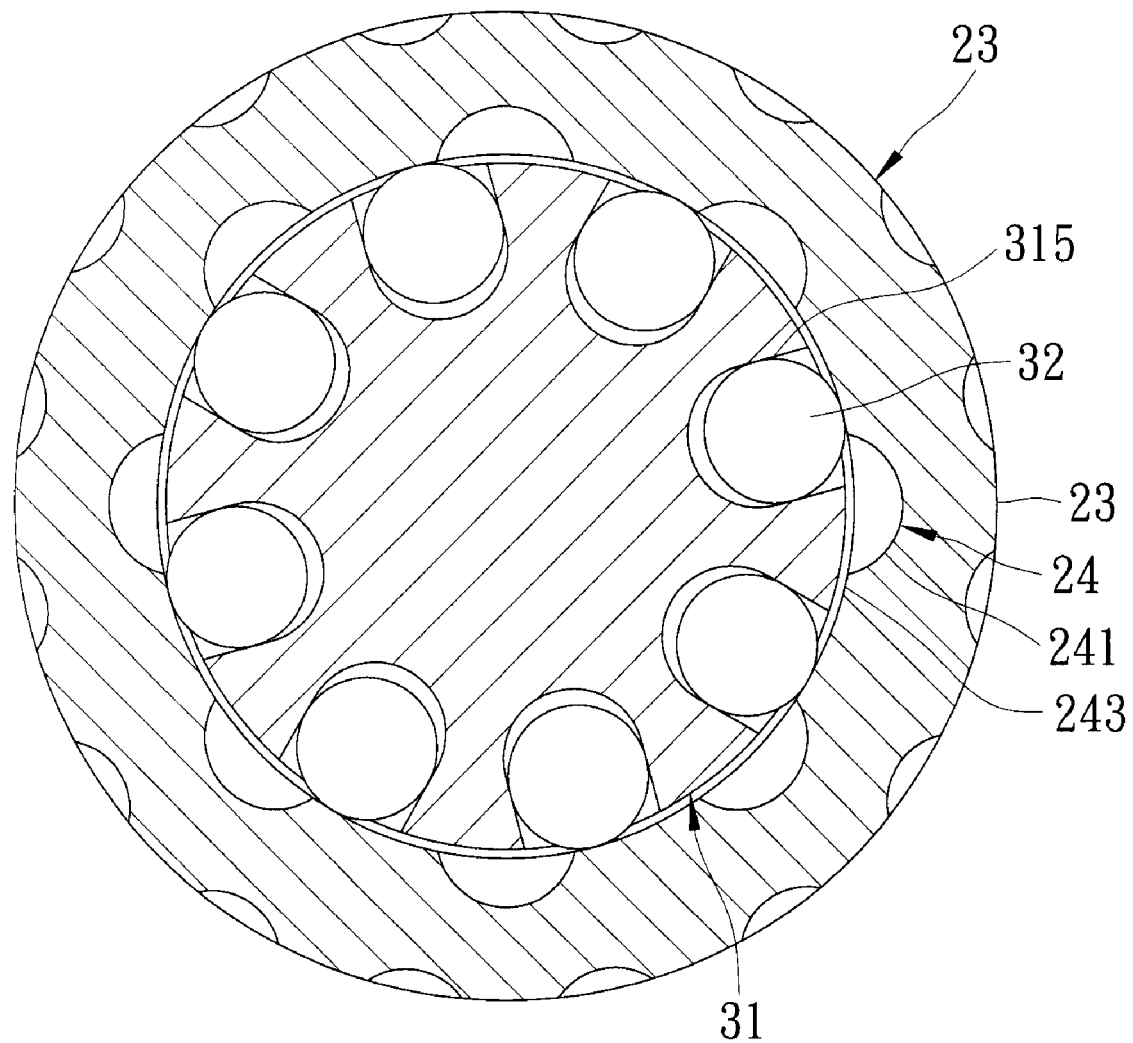
FIG. 20 is a cross-sectional view in an overloaded state.

When the locking sleeve 74 is in a locking position, as shown in FIG. 18, the inner retaining hoop 71 is engaged in the second annular groove 744, and the inner spline surface segment 745 is in spline engagement with the first and second outer spline surfaces 524,721 such that the rotation of the wheel member 52 is prevented.

Figure 17:
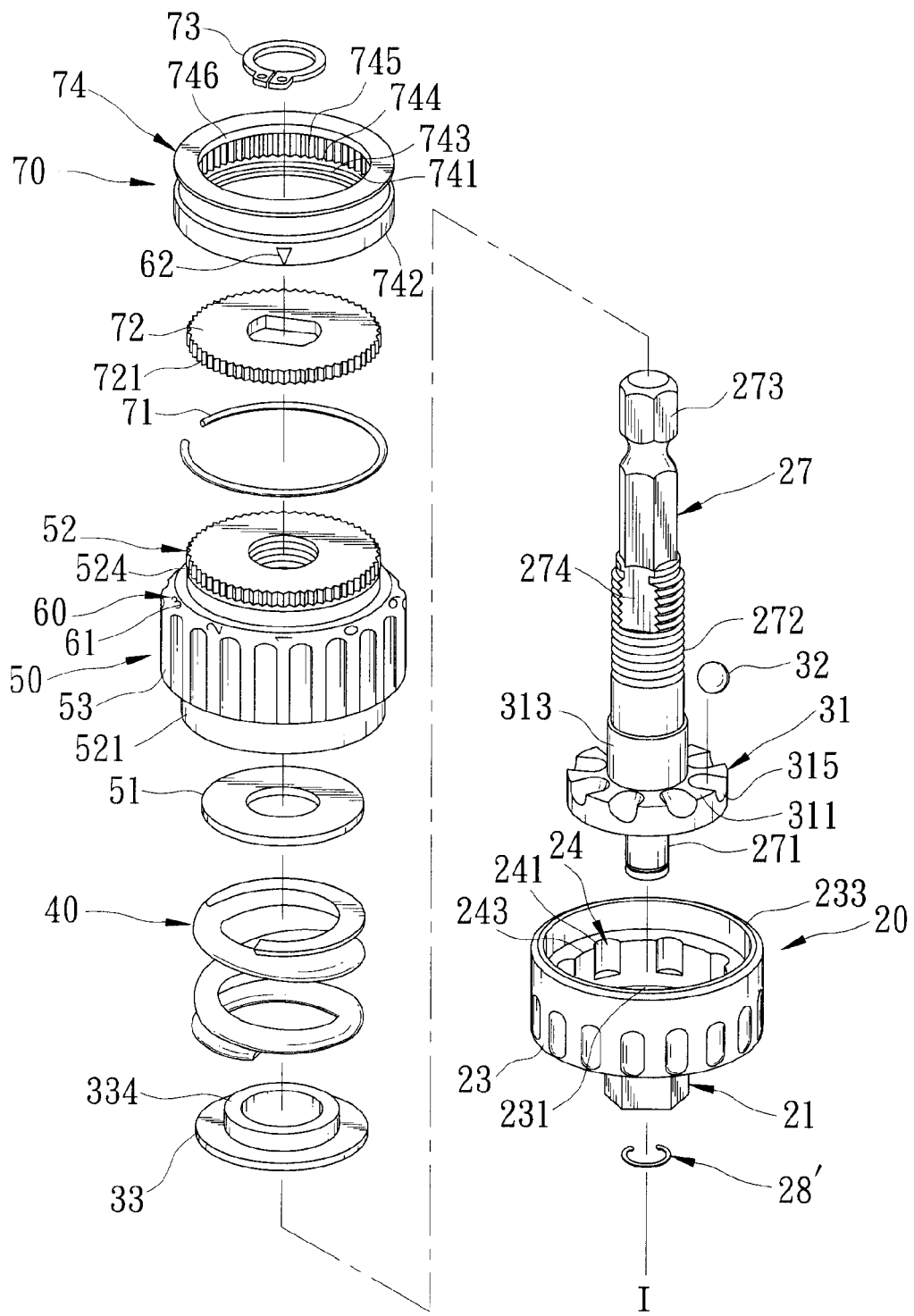
FIG. 17 is an exploded perspective view of the third preferred embodiment of an adjustable torque limiting device according to this invention.
Figure 21:
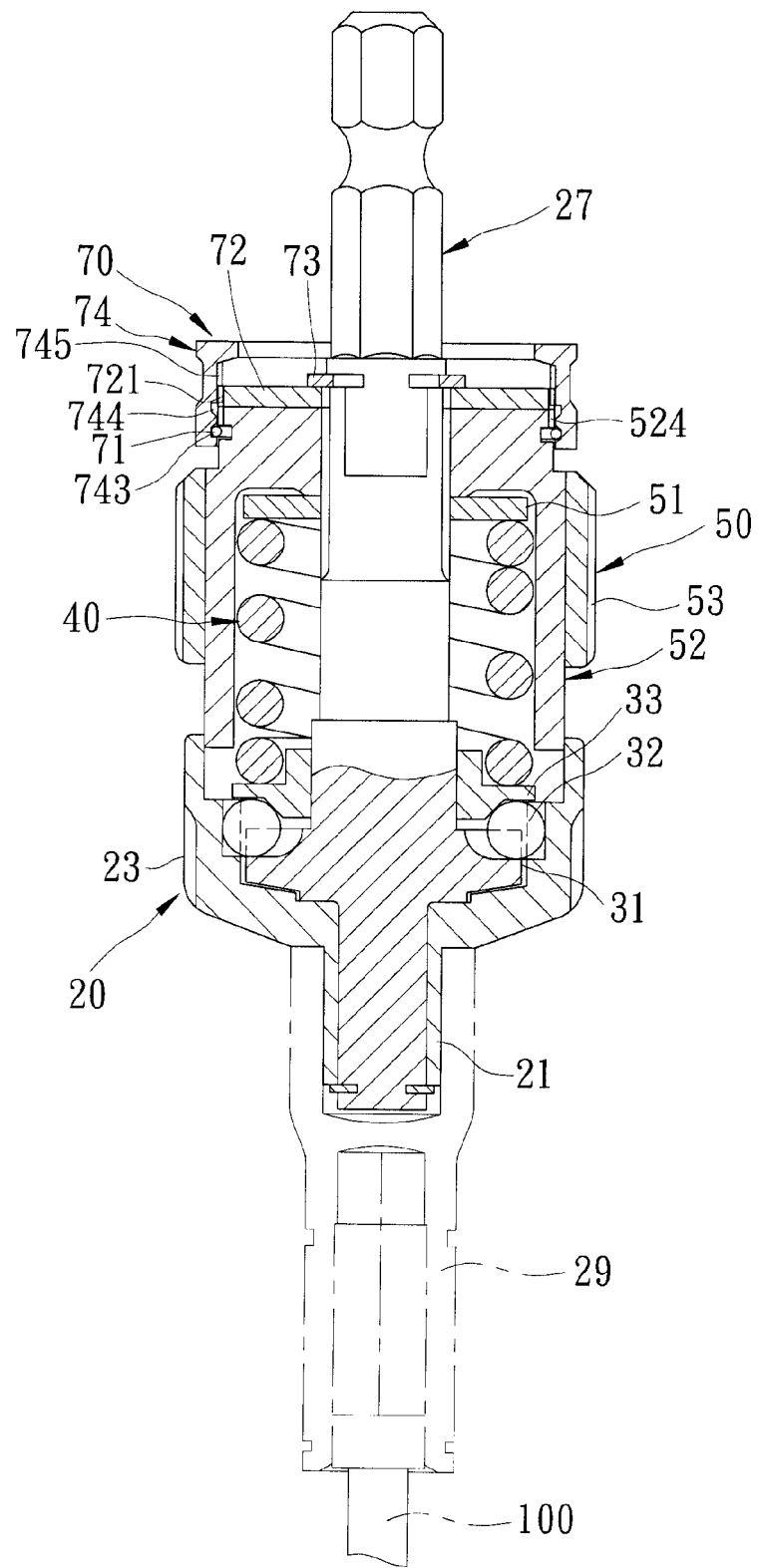
FIG. 21 is a sectional view of the third preferred embodiment in an unlocked state.
Figure 22:
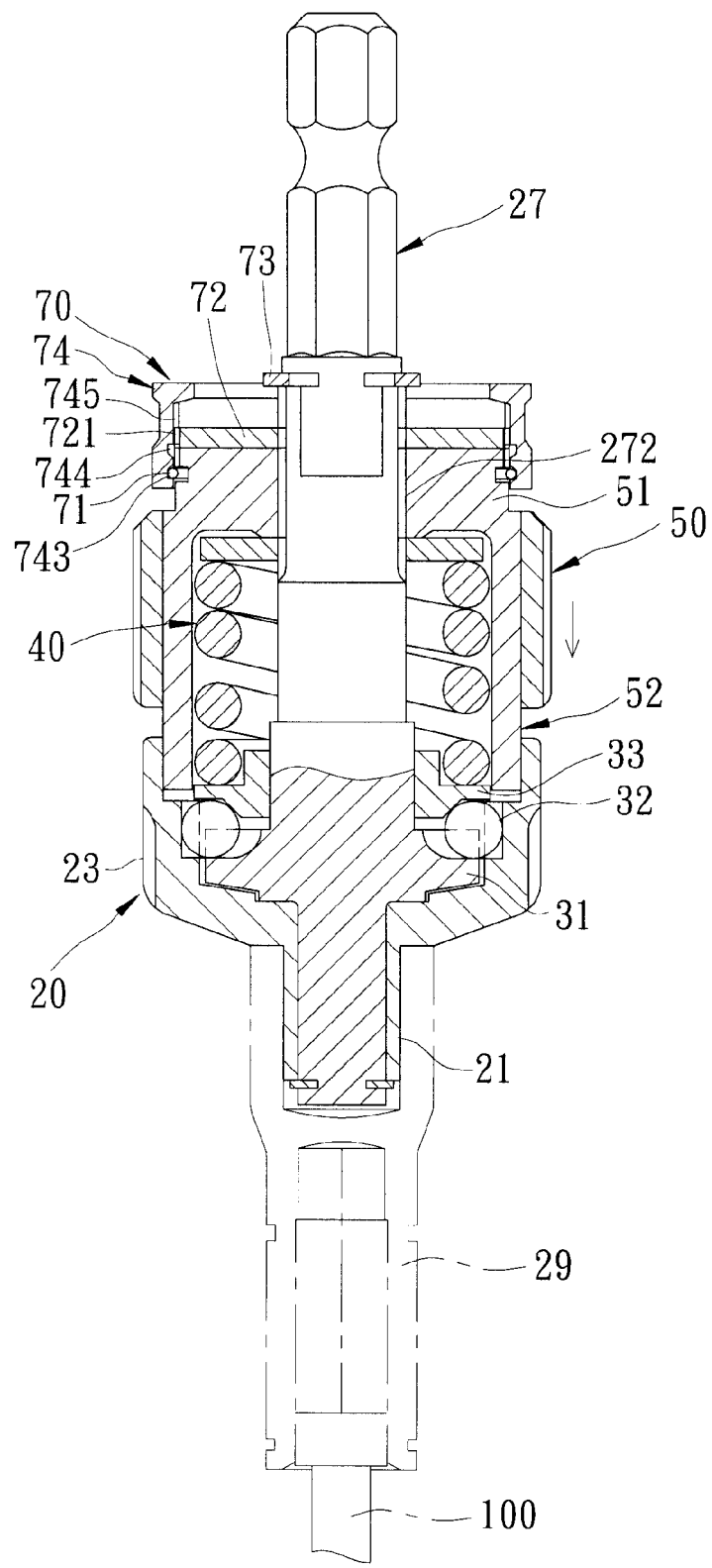
FIG. 22 is a sectional view of the third preferred embodiment in a preload increased state.
Figure 23:
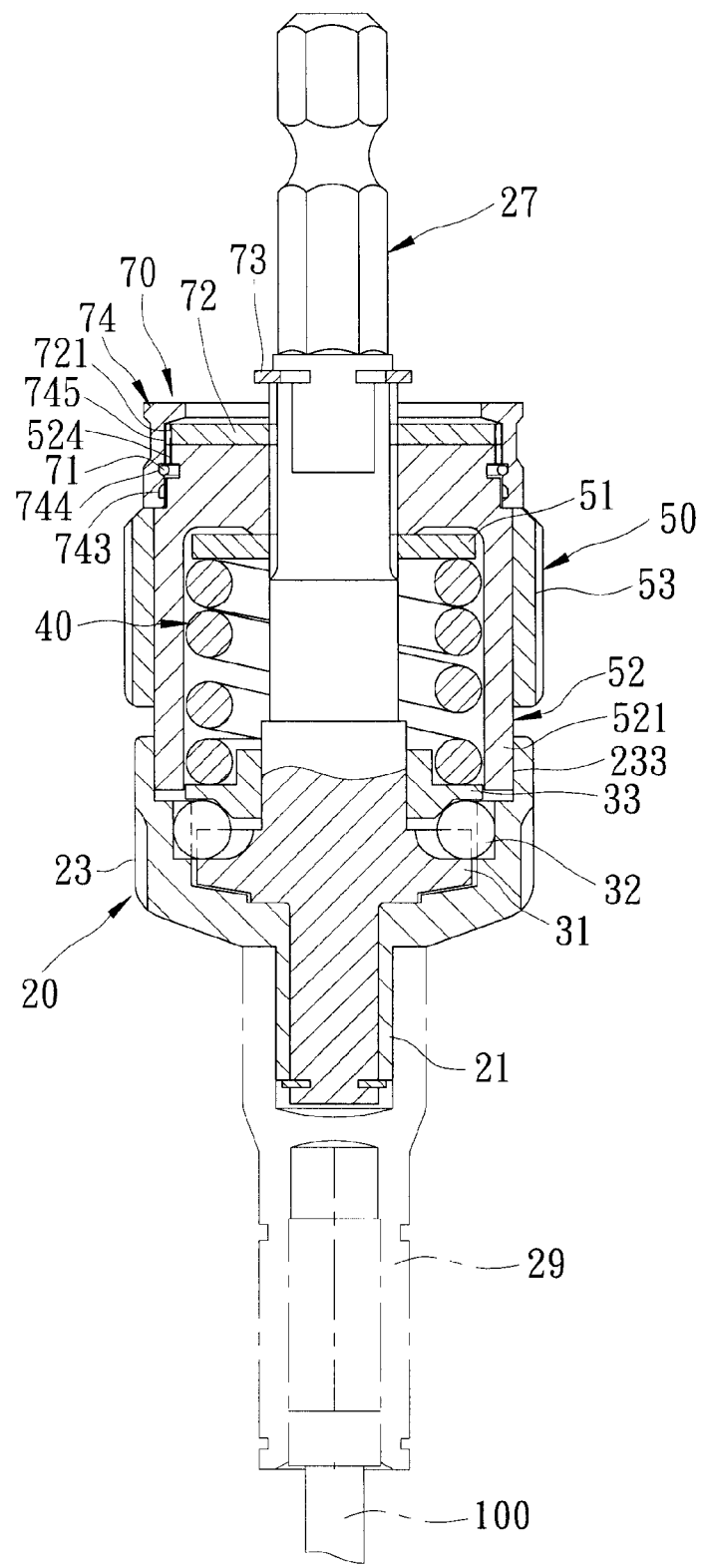
FIG. 23 is a sectional view of the third preferred embodiment in the preload increased and locked state.

As shown in FIGS. 17 and 21, when the locking sleeve 74 is moved to an unlocking position, the inner retaining hoop 71 is engaged in the first annular groove 743, and the inner spline surface segment 745 is disengaged from the first outer spline surface 524 so as to permit rotation of the wheel member 52 for torque adjustment, as shown in FIGS. 22 and 23.

Further, the calibrated scale unit 60 includes a calibrated scale 61 formed on an outer tubular surface of the drive ring 53, and a pointer 62 formed on the outer sleeve surface 742 of the locking sleeve 74.

As mentioned above, according to this invention, the adjustable torque limiting device can enhance the structural strength of the torque wrench and increase the precision of torque adjustment, and can be used to smoothly tighten a workpiece. Furthermore, by virtue of the locking unit 70, undesired rotation of the wheel member 52 can be avoided.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. An adjustable torque limiting device comprising:
 a first shank extending along a longitudinal axis, and having a first lever-side end and a first coupling end opposite to each other; and
 a second shank extending along the longitudinal axis, and having a second lever-side end and a second coupling end which is opposite to said second lever-side end along the longitudinal axis, and which is coaxially coupled with said first coupling end such that said first and second shanks are axially unmovable relative to each other to thereby constitute a shank unit, said second shank further having a threaded segment disposed between said second lever-side end and said second coupling end;

a carrier unit mounted proximate to said first and second coupling ends, and having at least two detent assemblies which are diametrically opposite to each other, each of said detent assemblies having
- a bearing region which faces axially and away from said first lever-side end, and
- a detent region which faces in a radial direction relative to the longitudinal axis, and which cooperates with said bearing region to define a cavity;

at least two detent bodies, each having a peripheral surface which has a force-delivering area and a force-receiving area, each of said detent bodies being received in said cavity such that said force-receiving area is engaged with said detent region to transmit a straining force emanating from said detent region to said force-delivering area;

a force-counteracting member which is mounted on and which is axially movable relative to said shank unit, said force-counteracting member including at least two counteracting surface segments, each of which extends radially and is axially spaced apart from said bearing region, each of said counteracting surface segments being in frictional engagement with said force-delivering area such that said force-counteracting member is pushed to move away from said bearing region once the straining force exceeds a preloaded force which is set to act on a respective one of said counteracting surface segments against the straining force; and an adjustable preload unit including
- an adjusting assembly which is threadedly engaged with said threaded segment such that said adjusting assembly is axially movable relative to said force-counteracting member by turning about the longitudinal axis, and
- at least one compressible biasing member which is disposed between said force-counteracting member and said adjusting assembly, and which is axially compressible such that, in response to movement of said adjusting unit, said biasing members is compressed to exert the preloaded force on said counteracting surface segments.

2. The adjustable torque limiting device according to claim 1, wherein said carrier unit includes
- an annular mount which is formed integrally with and which extends radially from said first coupling end of said first shank, and which has an inner tubular surface that surrounds the longitudinal axis to define a compartment therein, said inner tubular surface having said detent regions, said second coupling end of said second shank extending into said compartment to be surrounded by said inner tubular surface, and
- a tubular bearing seat which is disposed in said compartment and which is non-rotatably mounted on said second coupling end, said tubular bearing seat having a circumferential surface that faces axially and away from said first lever-side end, and that has said bearing regions.

3. The adjustable torque limiting device according to claim 2, wherein said bearing seat has an axially extending tubular wall which is radially spaced apart from said inner tubular surface, and which is configured to permit said force-counteracting member to be movably sleeved thereon.

4. The adjustable torque limiting device according to claim 3, wherein each of said counteracting surface segments has a cam surface region which is configured to radially urge said force-receiving area of a respective one of said detent bodies to said detent region of a respective one of said detent assemblies.

5. The adjustable torque limiting device according to claim 1, further comprising a guiding unit which is mounted on said second shank, and which defines at least two guideways, each extending along the longitudinal axis to be in spatial communication with said cavity of a respective one of said detent assemblies such that each of said biasing members is compressible along a respective one of said guideways.

6. The adjustable torque limiting device according to claim 5, wherein said guiding unit is in the form of a tubular barrel which is non-rotatably mounted on said second coupling end of said second shank and which has a plurality of passages that are angularly displaced from one another about the longitudinal axis to serve as said guideways.

7. The adjustable torque limiting device according to claim 3, wherein said axially extending tubular wall has an outer tubular surface which radially confronts said inner tubular surface, and which has two diametrically opposite confronting regions, each extending radially to join said bearing region of a respective one of said detent assemblies, at least one of said confronting and bearing regions having a cam surface configured to radially urge a respective one of said detent bodies to said detent region of the respective one of said detent assemblies.

8. The adjustable torque limiting device according to claim 7, wherein said peripheral surface of each of said detent bodies is spherical.

9. The adjustable torque limiting device according to claim 7, wherein each of said detent bodies extends axially and has two ends which are opposite to each other along the longitudinal axis, and which are respectively brought into frictional engagement with a respective one of said counteracting surface segments and said bearing region of the respective one of said detent assemblies.

10. The adjustable torque limiting device according to claim 4, wherein each of said detent bodies has a slope which is configured to mate with said cam surface region of a respective one of said counteracting surface segments so as to serve as said force-delivering area.

11. The adjustable torque limiting device according to claim 7, wherein each of said detent bodies includes a cylindrical stem extending axially and serving as said force-receiving area, and a ball which is in frictional engagement with both said cylindrical stem and said counteracting segment surface so as to serve as said force-delivering area.

12. The adjustable torque limiting device according to claim 5, wherein said first shank has an intermediate segment which is interposed between said first lever-side and coupling ends, said carrier unit including
- a tubular wall which is integrally formed with said intermediate segment and which has an outer surrounding surface that has said detent regions, and
- a tubular bearing seat which is non-rotatably mounted to said second shank, and which has a circumferential surface that faces axially and away from said first lever-side end, and that has said bearing regions.

13. The adjustable torque limiting device according to claim 12, wherein said guiding unit includes a barrel wall which surrounds said tubular wall and said tubular bearing seat to cooperatively define an annular compartment for guarding each of said detent bodies against movement out of said cavity.

14. The adjustable torque limiting device according to claim 13, wherein said guiding unit includes a plurality of partitioning walls which are displaced angularly from one another about the longitudinal axis, and which extend radially from said second coupling end toward said barrel wall so as to define a plurality of passages that serve as said guideways.

15. The adjustable torque limiting device according to claim 14, wherein said guiding unit further includes a small-diameter sleeve which extends axially from said barrel wall and which is non-rotatably mounted on said second shank, said adjusting assembly including a press plate which is sleeved on and which is axially movable relative to said second coupling end, an internally threaded wheel member which is threadedly engaged with said threaded segment such that threaded movement of said internally threaded wheel member relative to said threaded segment results in axial movement of said press plate relative to said force-counteracting member, an actuated plate which is actuated by virtue of the threaded movement of said internally threaded wheel member to axially move relative to said force-counteracting member, and a stabilizer unit which extends through said small-diameter sleeve to engage both said actuated plate and said press plate so as to result in synchronous movement of said press plate and said actuated plate.

16. The adjustable torque limiting device according to claim 15, wherein said internally threaded wheel member has a rim configured to be axially registered with said barrel wall, said device further comprising a calibrated scale which is formed on an outer tubular surface of said barrel wall, and a pointer which is disposed to move angularly with said rim for setting a predetermined value indicative of a predetermined amount of torque adjustment on said calibrated scale.

17. The adjustable torque limiting device according to claim 16, wherein said second coupling end has a blind hole extending along the longitudinal axis to permit insertion of said first coupling end into said blind hole, said device further comprising a ball which is disposed in said blind hole to engage said first coupling end so as to facilitate engagement between said first and second shanks.

18. The adjustable torque limiting device according to claim 1, wherein said adjusting assembly includes a press plate which is sleeved on and which is axially movable relative to said threaded segment, an internally threaded wheel member which is threadedly engaged with said threaded segment such that threaded movement of said internally threaded wheel member relative to said threaded segment results in axial movement of said press plate relative to said force-counteracting member, and which has a rim, and a drive ring which surrounds and is in spline engagement with said rim.

19. The adjustable torque limiting device according to claim 18, wherein said wheel member has a first outer spline surface, and further comprising by a locking unit which includes a rotation preventing ring non-rotatably mounted on said second shank, and having a second outer spline surface, and a locking sleeve having an inner spline surface segment in spline engagement with said first and second outer spline surfaces such that said locking sleeve is axially movable between a locking position, where threaded movement of said wheel member is prevented, and an unlocking position, where said inner spline surface segment is disengaged from said first outer spline surface to permit the threaded movement of said wheel member.

20. The adjustable torque limiting device according to claim 19, wherein aid locking unit further includes a retaining hoop which is looped about said wheel member and which is in retainingly and axially slidable engagement with said locking sleeve so as to facilitate displacement of said locking sleeve between the locking and unlocking positions.

\* \* \* \* \*